United States Patent
Dussan et al.

(10) Patent No.: US 10,495,757 B2
(45) Date of Patent: Dec. 3, 2019

(54) INTELLIGENT LADAR SYSTEM WITH LOW LATENCY MOTION PLANNING UPDATES

(71) Applicant: AEYE, Inc., Fairview Heights, IL (US)

(72) Inventors: Luis Carlos Dussan, Dublin, CA (US); Allan Steinhardt, Brentwood, CA (US); Joel David Benscoter, Pleasanton, CA (US); Jordan Spencer Greene, Novato, CA (US)

(73) Assignee: AEYE, INC., Fairview Heights, IL (US)

( * ) Notice: Subject to any disclaimer, the term of this patent is extended or adjusted under 35 U.S.C. 154(b) by 0 days.

(21) Appl. No.: 16/106,350

(22) Filed: Aug. 21, 2018

(65) Prior Publication Data

US 2019/0086550 A1    Mar. 21, 2019

Related U.S. Application Data

(60) Provisional application No. 62/693,078, filed on Jul. 2, 2018, provisional application No. 62/558,937, filed on Sep. 15, 2017.

(51) Int. Cl.

| | |
|---|---|
| G06F 17/10 | (2006.01) |
| G08G 1/16 | (2006.01) |
| G01S 17/93 | (2006.01) |
| G01S 17/42 | (2006.01) |
| G01S 7/481 | (2006.01) |
| G01S 17/02 | (2006.01) |
| G01S 7/484 | (2006.01) |

(Continued)

(52) U.S. Cl.
CPC ............ *G01S 17/936* (2013.01); *G01S 7/484* (2013.01); *G01S 7/4814* (2013.01); *G01S 7/4817* (2013.01); *G01S 7/4861* (2013.01); *G01S 17/023* (2013.01); *G01S 17/10* (2013.01); *G01S 17/42* (2013.01); *G01S 17/89* (2013.01)

(58) Field of Classification Search
None
See application file for complete search history.

(56) References Cited

U.S. PATENT DOCUMENTS

| | | |
|---|---|---|
| 4,579,430 A | 4/1986 | Bille |
| 5,552,893 A | 9/1996 | Akasu |

(Continued)

FOREIGN PATENT DOCUMENTS

| | | |
|---|---|---|
| CN | 103885065 A | 6/2014 |
| WO | 2004034084 A1 | 4/2004 |

(Continued)

OTHER PUBLICATIONS

Analog Devices, "Data Sheet AD9680", 98 pages, 2014-2015.

(Continued)

Primary Examiner — Bhavesh V Amin
(74) Attorney, Agent, or Firm — Thompson Coburn LLP

(57) ABSTRACT

Systems and methods are disclosed for vehicle motion planning where a sensor, such as a ladar system, is used to detect threatening or anomalous conditions within the sensor's field of view so that priority warning data about such conditions can be inserted at low latency into the motion planning loop of a motion planning computer system for the vehicle. The ladar system can perform compressive sensing to target the field of view with a plurality of ladar pulses.

65 Claims, 26 Drawing Sheets

(51) Int. Cl.
*G01S 7/486* (2006.01)
*G01S 17/10* (2006.01)
*G01S 17/89* (2006.01)

(56) References Cited

U.S. PATENT DOCUMENTS

| | | |
|---|---|---|
| 5,625,644 A | 4/1997 | Myers |
| 5,638,164 A | 6/1997 | Landau |
| 5,808,775 A | 9/1998 | Inagaki et al. |
| 5,815,250 A | 9/1998 | Thomson et al. |
| 5,831,719 A | 11/1998 | Berg et al. |
| 6,031,601 A | 2/2000 | McCusker et al. |
| 6,245,590 B1 | 6/2001 | Wine et al. |
| 6,288,816 B1 | 9/2001 | Melville et al. |
| 6,847,462 B1 | 1/2005 | Kacyra et al. |
| 6,926,227 B1 | 8/2005 | Young et al. |
| 7,206,063 B2 | 4/2007 | Anderson et al. |
| 7,236,235 B2 | 6/2007 | Dimsdale |
| 7,701,558 B2 | 4/2010 | Walsh et al. |
| 7,800,736 B2 | 9/2010 | Pack et al. |
| 7,894,044 B1 | 2/2011 | Sullivan |
| 7,944,548 B2 | 5/2011 | Eaton |
| 8,072,663 B2 | 12/2011 | O'Neill et al. |
| 8,081,301 B2 | 12/2011 | Stann et al. |
| 8,120,754 B2 | 2/2012 | Kaehler |
| 8,228,579 B2 | 7/2012 | Sourani |
| 8,427,657 B2 | 4/2013 | Milanovi |
| 8,635,091 B2* | 1/2014 | Amigo ............... G07C 5/008 705/35 |
| 8,681,319 B2 | 3/2014 | Tanaka et al. |
| 8,896,818 B2 | 11/2014 | Walsh et al. |
| 9,069,061 B1 | 6/2015 | Harwit |
| 9,085,354 B1 | 7/2015 | Peeters et al. |
| 9,128,190 B1 | 9/2015 | Ulrich et al. |
| 9,261,881 B1 | 2/2016 | Ferguson et al. |
| 9,278,689 B1 | 3/2016 | Delp |
| 9,285,477 B1 | 3/2016 | Smith et al. |
| 9,305,219 B2 | 4/2016 | Ramalingam et al. |
| 9,315,178 B1 | 4/2016 | Ferguson et al. |
| 9,336,455 B1 | 5/2016 | Withers et al. |
| 9,360,554 B2 | 6/2016 | Retterath et al. |
| 9,383,753 B1 | 7/2016 | Templeton et al. |
| 9,437,053 B2 | 9/2016 | Jenkins et al. |
| 9,575,184 B2 | 2/2017 | Gilliland et al. |
| 9,841,495 B2 | 12/2017 | Campbell et al. |
| 9,885,778 B2 | 2/2018 | Dussan |
| 9,897,687 B1 | 2/2018 | Campbell et al. |
| 9,897,689 B2 | 2/2018 | Dussan |
| 9,933,513 B2 | 4/2018 | Dussan et al. |
| 9,958,545 B2 | 5/2018 | Eichenholz et al. |
| 10,007,001 B1 | 6/2018 | LaChapelle et al. |
| 10,042,043 B2 | 8/2018 | Dussan |
| 10,042,159 B2 | 8/2018 | Dussan et al. |
| 10,073,166 B2 | 9/2018 | Dussan |
| 10,078,133 B2 | 9/2018 | Dussan |
| 10,185,028 B2 | 1/2019 | Dussan et al. |
| 10,209,349 B2 | 2/2019 | Dussan et al. |
| 10,215,848 B2 | 2/2019 | Dussan |
| 10,282,591 B2 | 5/2019 | Lindner et al. |
| 2003/0122687 A1* | 7/2003 | Trajkovic ............ B60Q 9/005 340/932.2 |
| 2003/0151542 A1 | 8/2003 | Steinlechner et al. |
| 2005/0057654 A1 | 3/2005 | Byren |
| 2005/0216237 A1 | 9/2005 | Adachi et al. |
| 2006/0007362 A1 | 1/2006 | Lee et al. |
| 2006/0176468 A1 | 8/2006 | Anderson et al. |
| 2006/0197936 A1 | 9/2006 | Liebman et al. |
| 2006/0227315 A1 | 10/2006 | Beller |
| 2006/0265147 A1 | 11/2006 | Yamaguchi et al. |
| 2008/0136626 A1* | 6/2008 | Hudson ............... G01S 17/023 340/540 |
| 2008/0159591 A1* | 7/2008 | Ruedin .............. G06K 9/00362 382/103 |
| 2009/0059201 A1 | 3/2009 | Willner et al. |
| 2009/0128864 A1 | 5/2009 | Inage |
| 2009/0242468 A1* | 10/2009 | Corben ................ C02F 1/008 210/96.1 |
| 2009/0292468 A1* | 11/2009 | Wu .................... G01S 13/726 701/301 |
| 2010/0027602 A1 | 2/2010 | Abshire et al. |
| 2010/0053715 A1 | 3/2010 | O'Neill et al. |
| 2010/0165322 A1 | 7/2010 | Kane et al. |
| 2010/0204964 A1 | 8/2010 | Pack et al. |
| 2011/0066262 A1* | 3/2011 | Kelly ................ G05B 23/0267 700/90 |
| 2011/0149268 A1 | 6/2011 | Marchant et al. |
| 2011/0149360 A1 | 6/2011 | Sourani |
| 2011/0153367 A1* | 6/2011 | Amigo ................ G06Q 40/08 705/4 |
| 2011/0260036 A1 | 10/2011 | Baraniuk et al. |
| 2011/0282622 A1 | 11/2011 | Canter |
| 2011/0317147 A1 | 12/2011 | Campbell et al. |
| 2012/0044093 A1 | 2/2012 | Pala |
| 2012/0044476 A1 | 2/2012 | Earhart et al. |
| 2012/0236379 A1 | 9/2012 | da Silva et al. |
| 2012/0249996 A1 | 10/2012 | Tanaka et al. |
| 2012/0257186 A1 | 10/2012 | Rieger et al. |
| 2014/0021354 A1 | 1/2014 | Gagnon et al. |
| 2014/0078514 A1 | 3/2014 | Zhu |
| 2014/0211194 A1 | 7/2014 | Pacala et al. |
| 2014/0291491 A1 | 10/2014 | Shpunt et al. |
| 2014/0300732 A1 | 10/2014 | Friend et al. |
| 2014/0350836 A1 | 11/2014 | Stettner et al. |
| 2015/0081211 A1 | 3/2015 | Zeng et al. |
| 2015/0269439 A1 | 9/2015 | Versace et al. |
| 2015/0304634 A1 | 10/2015 | Karvounis |
| 2015/0331113 A1 | 11/2015 | Stettner et al. |
| 2015/0369920 A1 | 12/2015 | Setono et al. |
| 2015/0378011 A1 | 12/2015 | Owechko |
| 2015/0378187 A1 | 12/2015 | Heck et al. |
| 2016/0003946 A1 | 1/2016 | Gilliland et al. |
| 2016/0005229 A1 | 1/2016 | Lee et al. |
| 2016/0041266 A1 | 2/2016 | Smits |
| 2016/0047895 A1 | 2/2016 | Dussan |
| 2016/0047896 A1 | 2/2016 | Dussan |
| 2016/0047897 A1 | 2/2016 | Dussan |
| 2016/0047898 A1 | 2/2016 | Dussan |
| 2016/0047899 A1 | 2/2016 | Dussan |
| 2016/0047900 A1 | 2/2016 | Dussan |
| 2016/0047903 A1 | 2/2016 | Dussan |
| 2016/0146595 A1 | 5/2016 | Boufounos et al. |
| 2016/0274589 A1 | 9/2016 | Templeton et al. |
| 2016/0293647 A1 | 10/2016 | Lin et al. |
| 2017/0158239 A1 | 6/2017 | Dhome et al. |
| 2017/0199280 A1 | 7/2017 | Nazemi et al. |
| 2017/0205873 A1 | 7/2017 | Shpunt et al. |
| 2017/0211932 A1 | 7/2017 | Zadravec et al. |
| 2017/0219695 A1 | 8/2017 | Hall et al. |
| 2017/0234973 A1 | 8/2017 | Axelsson |
| 2017/0242102 A1 | 8/2017 | Dussan et al. |
| 2017/0242103 A1 | 8/2017 | Dussan |
| 2017/0242104 A1 | 8/2017 | Dussan |
| 2017/0242105 A1 | 8/2017 | Dussan et al. |
| 2017/0242106 A1 | 8/2017 | Dussan et al. |
| 2017/0242107 A1 | 8/2017 | Dussan et al. |
| 2017/0242108 A1 | 8/2017 | Dussan et al. |
| 2017/0242109 A1 | 8/2017 | Dussan et al. |
| 2017/0263048 A1 | 9/2017 | Glaser et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0307876 A1 | 10/2017 | Dussan et al. |
| 2018/0031703 A1 | 2/2018 | Ngai et al. |
| 2018/0075309 A1 | 3/2018 | Sathyanarayana et al. |
| 2018/0120436 A1 | 5/2018 | Smits |
| 2018/0143300 A1 | 5/2018 | Dussan |
| 2018/0143324 A1 | 5/2018 | Keilaf et al. |
| 2018/0188355 A1 | 7/2018 | Bao et al. |
| 2018/0224533 A1 | 8/2018 | Dussan et al. |
| 2018/0238998 A1 | 8/2018 | Dussan et al. |
| 2018/0239000 A1 | 8/2018 | Dussan et al. |
| 2018/0239001 A1 | 8/2018 | Dussan et al. |
| 2018/0239004 A1 | 8/2018 | Dussan et al. |

(56) References Cited

U.S. PATENT DOCUMENTS

| | | | |
|---|---|---|---|
| 2018/0239005 | A1 | 8/2018 | Dussan et al. |
| 2018/0284234 | A1 | 10/2018 | Curatu |
| 2018/0284278 | A1 | 10/2018 | Russell et al. |
| 2018/0284279 | A1 | 10/2018 | Campbell et al. |
| 2018/0299534 | A1 | 10/2018 | LaChapelle et al. |
| 2018/0306927 | A1 | 10/2018 | Slutsky et al. |
| 2018/0341103 | A1 | 11/2018 | Dussan et al. |
| 2019/0025407 | A1 | 1/2019 | Dussan |
| 2019/0086514 | A1 | 3/2019 | Dussan et al. |

FOREIGN PATENT DOCUMENTS

| | | | |
|---|---|---|---|
| WO | 2006/076474 | A1 | 7/2006 |
| WO | 2008008970 | A2 | 1/2008 |
| WO | 2016025908 | A2 | 2/2016 |
| WO | 2017/143183 | A1 | 8/2017 |
| WO | 2017/143217 | A1 | 8/2017 |
| WO | 2018/152201 | A1 | 8/2018 |
| WO | 2019010425 | A1 | 1/2019 |

OTHER PUBLICATIONS

Extended European Search Report for EP Application 15832272.7 dated Mar. 14, 2018.
Howland et al., "Compressive Sensing LIDAR for 3D Imaging", Optical Society of America, May 1-6, 2011, 2 pages.
International Preliminary Report on Patentability or PCT/US2017/018415 dated Aug. 30, 2018.
International Search Report and Written Opinion for PCT/US15/45399 dated Feb. 2, 2016.
International Search Report and Written Opinion for PCT/US2017/018359 dated Jun. 19, 2017.
International Search Report and Written Opinion for PCT/US2017/018415 dated Jul. 6, 2017.
International Search Report and Written Opinion for PCT/US2018/018179 dated Jun. 26, 2018.
Kessler, "An afocal beam relay for laser XY scanning systems", Proc. of SPIE vol. 8215, 9 pages, 2012.
Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.
Maxim Integrated Products, Inc., Tutorial 800, "Design a Low-Jitter Clock for High Speed Data Converters", 8 pages, Jul. 17, 2002.
Moss et al., "Low-cost compact MEMS scanning LADAR system for robotic applications", Proc. of SPIE, 2012, vol. 8379, 837903-1 to 837903-9.
Notice of Allowance for U.S. Appl. No. 15/896,241 dated Sep. 12, 2018.
Notice of Allowance for U.S. Appl. No. 15/896,254 dated Nov. 23, 2018.
Office Action for U.S. Appl. No. 15/431,096 dated Nov. 14, 2017.
Office Action for U.S. Appl. No. 15/896,233 dated Jun. 22, 2018.
Office Action for U.S. Appl. No. 15/896,241 dated Jun. 21, 2018.
Office Action for U.S. Appl. No. 15/896,254 dated Jun. 27, 2018.
Redmayne et al., "Understanding the Effect of Clock Jitter on High Speed ADCs", Design Note 1013, Linear Technology, 4 pages, 2006.
Rehn, "Optical properties of elliptical reflectors", Opt. Eng. 43(7), pp. 1480-1488, Jul. 2004.
Sharafutdinova et al., "Improved field scanner incorporating parabolic optics. Part 1: Simulation", Applied Optics, vol. 18, No. 22, p. 4389-4396, Aug. 2009.
Office Action for U.S. Appl. No. 16/106,374 dated Jan. 30, 2019.
Office Action for U.S. Appl. No. 16/106,441 dated Jan. 29, 2019.
Chen et al., "Estimating Depth from RGB and Sparse Sensing", European Conference on Computer Vision, Springer, 2018, pp. 176-192.

\* cited by examiner

| Beam | time a | time b | 3ns pulse, 5:1 beamsplit, iid estimators, 15khz resonance, 100m range |
|---|---|---|---|
| A | Aa | Ab | |
| B | Ba | Bb | |
| C | Ca | Cc | | assume: v(range)=25m/s, a(range)=1m/s/s, az el v,a=10% range, 3mrad

| enhanced 3D positioning | | min time | max time |
|---|---|---|---|
| elevation: A' | Ac,Cb OR Ba,Cb | 30us | 2ms |
| azimuth:C' | Aa,Bb | 30us | 2ms |
| range | Aa,Ab OR Ba,Bb OR Ca,Cb | 30us | 500usec |

| enhanced 3D velocity | | min time | max time |
|---|---|---|---|
| elevation | Aa,Cb AND | 3ms | 10ms |
| azimuth | Aa,Bb | 3ms | 10ms |
| range | Aa,Ab Ba,Bb Ca,Cb | 1ms | 5ms |

Figure 12B

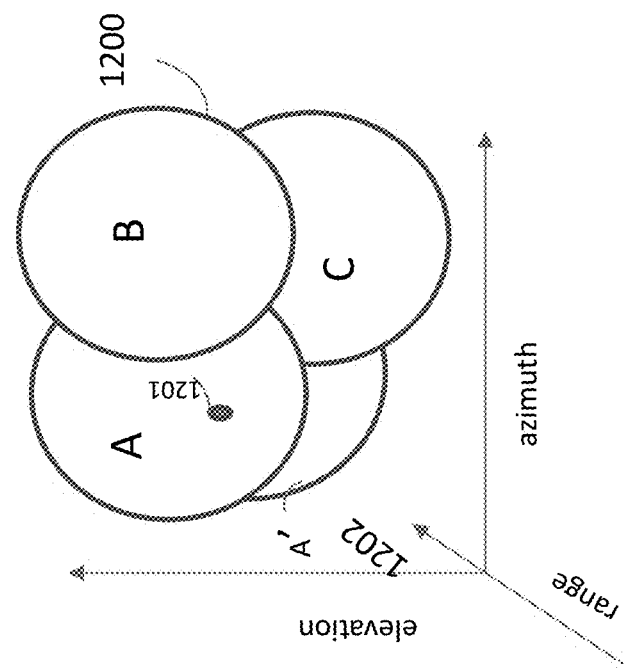

Figure 12A

INTELLIGENT LADAR SYSTEM WITH LOW LATENCY MOTION PLANNING UPDATES

CROSS-REFERENCE AND PRIORITY CLAIM TO RELATED PATENT APPLICATIONS

This patent application claims priority to U.S. provisional patent application 62/693,078, filed Jul. 2, 2018, and entitled "Intelligent Ladar System with Low Latency Motion Planning Updates", the entire disclosure of which is incorporated herein by reference.

This patent application also claims priority to U.S. provisional patent application 62/558,937, filed Sep. 15, 2017, and entitled "Intelligent Ladar System with Low Latency Motion Planning Updates", the entire disclosure of which is incorporated herein by reference.

This patent application is also related to (1) U.S. patent application Ser. No. 16/106,374, filed this same day, and entitled "Ladar Receiver with Co-Bore Sited Camera", (2) U.S. patent application Ser. No. 16,106,406, filed this same day, and entitled "Low Latency Intra-Frame Motion Estimation Based on Clusters of Ladar Pulses", and (3) U.S. patent application Ser. No. 16,106,441, filed this same day, and entitled "Ladar System with Intelligent Selection of Shot List Frames Based on Field of View Data", the entire disclosures of each of which are incorporated herein by reference.

INTRODUCTION

Safe autonomy in vehicles, whether airborne, ground, or sea-based, relies on rapid precision, characterization of, and rapid response to, dynamic obstacles. A conventional approach to autonomous obstacle detection and motion planning for moving vehicles is shown by FIG. 1. The system 100 for use with a vehicle comprises a motion planning system 102 in combination with a suite 104 of sensors 106. The sensors 106 in the suite 104 provide the motion planning system 102 with sensor data 120 for use in the obstacle detection and motion planning process. Sensor data ingest interface 108 within the motion planning system 102 receives the sensor data 120 from the sensors 106 and stores the sensor data 120 in a sensor data repository 130 where it will await processing. Motion planning intelligence 110 within the motion planning system 102 issues read or query commands 124 to the sensor data repository 130 and receives the requested sensor data as responses 126 to the queries 124. The intelligence 110 then analyzes this retrieved sensor data to make decisions 128 about vehicle motion that are communicated to one or more other vehicle subsystems. The motion planning intelligence 110 can also issue tasking commands 122 to the sensors 106 to exercise control over sensor data acquisition.

The system 100 of FIG. 1 effectively organizes the motion planning system 102 and the sensors suite 104 in a master-slave hierarchical relationship, which places large burdens on the motion planning system 102. These processing burdens result in motion decision-making delays arising from the amount of time it takes for the motion planning system 102 to ingest, store, retrieve, and analyze the sensor data.

As a technical improvement in the art, the inventors disclose a more collaborative model of decision-making as between the one or more of the sensors 106 and the motion planning system 102, whereby some of the intelligence regarding object and anomaly detection are moved into one or more of the sensors 106. In the event that the intelligent sensor detects an object of concern from the sensor data, the intelligent sensor can notify the motion planning system 102 via priority messaging or some other "fast path" notification. This priority messaging can serve as a vector interrupt that interrupts the motion planning system 102 to allow for the motion planning system 102 to quickly focus on the newly detected threat found by the intelligent sensor. Thus, unlike the master-slave relationship shown by FIG. 1, an example embodiment of a new faster approach to sensor-based motion planning can employ more of a peer-to-peer model for anomaly detection coupled with a capability for one or more intelligent sensors to issue priority messages/interrupts to the motion planning system. With this model, threats detected by the intelligent sensor can be pushed to the top of the data stack under consideration by the motion planning system 102.

The inventors also disclose a "fast path" for sensor tasking where threat detection by the intelligent sensor can trigger the intelligent sensor to insert new shot requests into a pipeline of sensor shots requested by the motion planning system. This allows the intelligent sensor to quickly obtain additional data about the newly detected threat without having to wait for the slower decision-making that would be produced by the motion planning system.

Furthermore, in an example embodiment, the inventors disclose that the intelligent sensor can be a ladar system that employs compressive sensing to reduce the number of ladar shots required to capture a frame of sensor data. When such a ladar system is combined with the collaborative/shared model for threat detection, where the ladar system can issue "fast path" priority messages to the motion planning system regarding possible threats, latency is further reduced. As used herein, the term "ladar" refers to and encompasses any of laser radar, laser detection and ranging, and light detection and ranging ("lidar").

Further still, the inventors disclose example embodiments where a camera is co-bore sited with a ladar receiver to provide low latency detection of objects in a field of view for a ladar system. A frequency-based beam splitter can be positioned to facilitate sharing of the same field of view by the ladar receiver and the camera.

Furthermore, the inventors also disclose example embodiments where tight clusters of overlapping ladar pulse shots are employed to facilitate the computation of motion data of objects on an intraframe basis. This allows the development of robust kinematic models of objects in a field of view on a low latency basis.

Moreover, the inventors also disclose techniques for selecting a defined shot list frame from among a plurality of defined shot list frames for use by a ladar transmitter to identify where ladar pulses will be targeted with respect to a given frame. These selections can be made based on processed data that represents one or more characteristics of a field of view for the ladar system, and the selections of shot list frames can vary from frame-to-frame.

These and other features and advantages of the present invention will be described hereinafter to those having ordinary skill in the art.

BRIEF DESCRIPTION OF THE DRAWINGS

FIG. 12A shows an example cluster pattern for ladar shots to facilitate intraframe motion computations.

FIG. 12B shows an example data table for beam clusters and velocity estimations.

DETAILED DESCRIPTION OF EXAMPLE EMBODIMENTS

Figure 1:
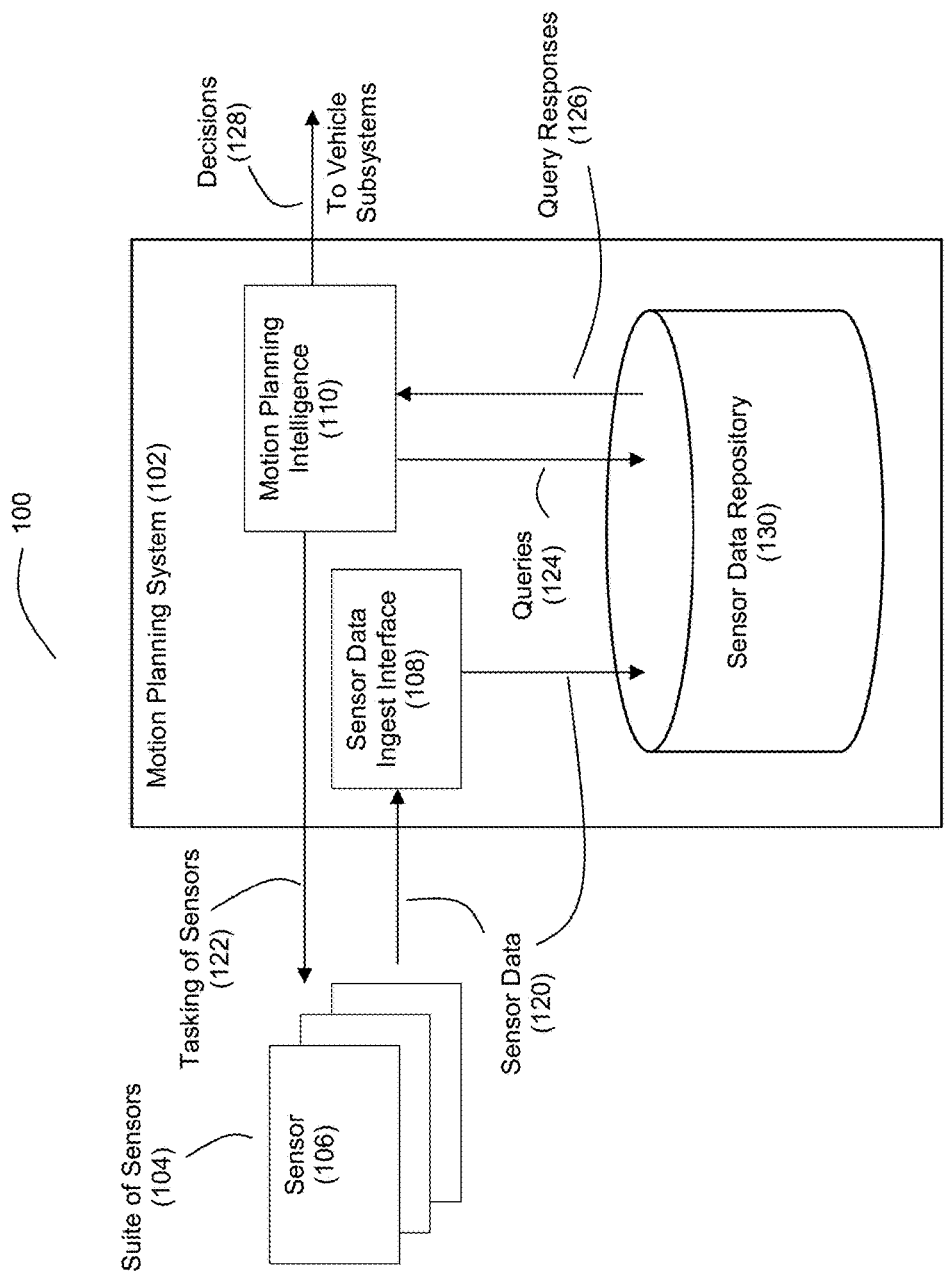
FIG. 1 discloses a conventional motion planning system for vehicle autonomy.
Figure 2:
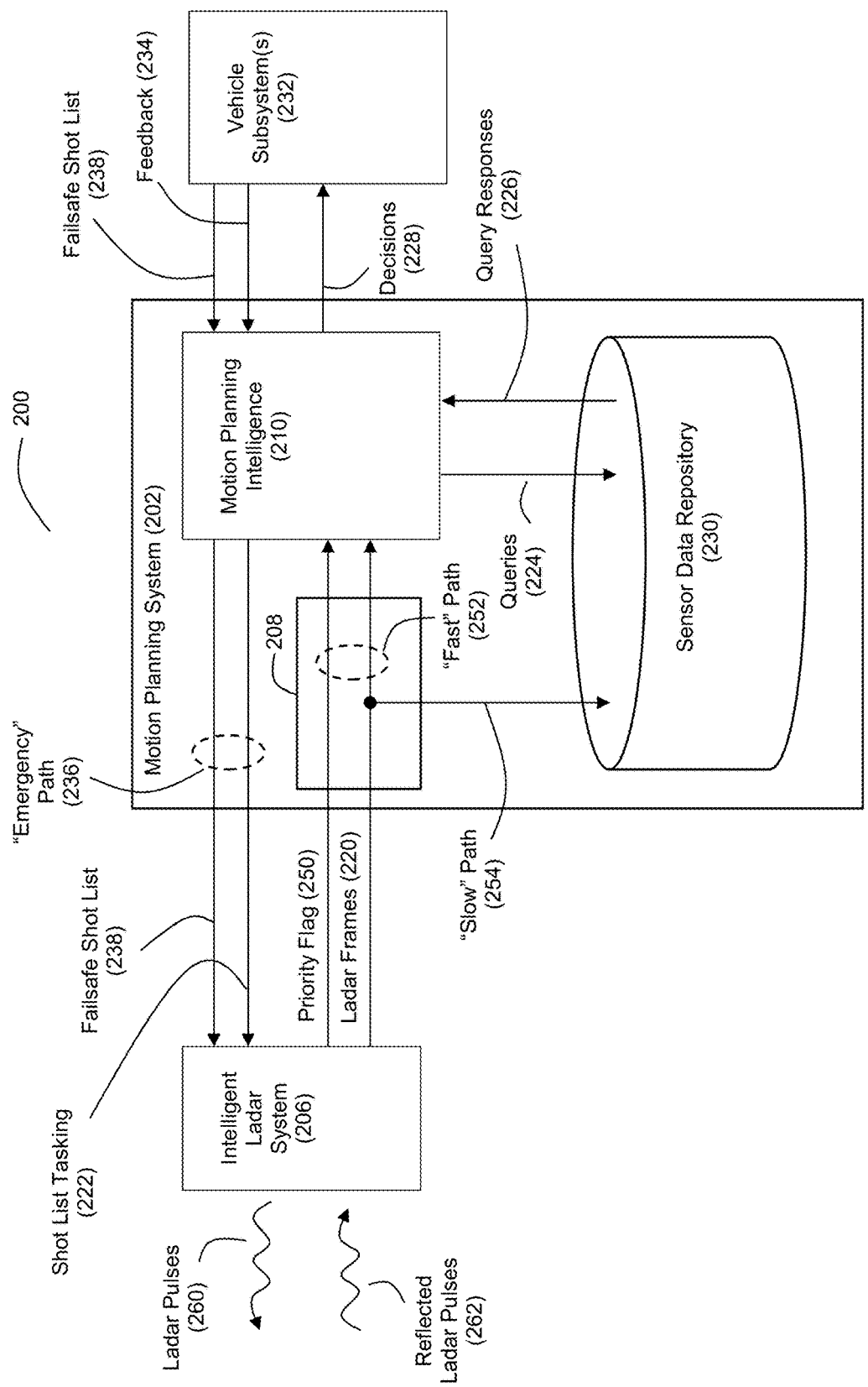
FIG. 2 discloses a motion planning system for vehicle autonomy in accordance with an example embodiment that includes a fast path notifications regarding threat detections from an intelligent ladar system.

FIG. 2 discloses an example system 200 for vehicle autonomy with respect to motion planning. In this example, the motion planning system 202 interacts with a sensor such as an intelligent ladar system 206 in a manner where the intelligent ladar system 206 is able to provide fast path notifications regarding detected threats. Unlike the conventional master-slave hierarchical relationship between a motion planning system and sensor, the example embodiment of FIG. 2 employs a collaborative model of decision-making as between an intelligent ladar system 206 and the motion planning system 202, whereby some of the intelligence regarding object and anomaly detection is positioned in the intelligent ladar system 206. Also, it should be understood that the system 200 may include sensors other than intelligent ladar system 206 that provide information to the motion planning system 202 (e.g., one or more cameras, one or more radars, one or more acoustic sensors, one or more vehicle telematics sensors (e.g., a brake sensor that can detect locked brakes; a tire sensor that can detect a flat tire), etc.), although for ease of illustration such other sensors are omitted from FIG. 2. It should be understood that one or more of such other sensors may also optionally employ the collaborative decision-making techniques disclosed herein if desired by a practitioner.

The intelligent ladar system 206 provides the motion planning system 202 with ladar frames 220 for use in the obstacle detection and motion planning process. These ladar frames 220 are generated in response to the ladar system firing ladar pulses 260 at targeted range points and then receiving and processing reflected ladar pulses 262. Example embodiments for a ladar system that can be used to support the ladar transmit and receive functions of the intelligent ladar system 206 are described in U.S. patent application Ser. No. 62/038,065 (filed Aug. 15, 2014) and U.S. Pat. App. Pubs. 2016/0047895, 2016/0047896, 2016/0047897, 2016/0047898, 2016/0047899, 2016/0047903, 2016/0047900, 2017/0242108, 2017/0242105, 2017/0242106, 2017/0242103, 2017/0242104, and 2017/0307876, the entire disclosures of each of which are incorporated herein by reference.

Sensor data ingest interface 208 within the motion planning system 202 receives the ladar frames data 220 from the intelligent ladar system 206 and stores the ladar frames data 220 in a sensor data repository 230 where it will await processing. Motion planning intelligence 210 within the motion planning system 202 issues read or query commands 224 to the sensor data repository 230 and receives the requested sensor data as responses 226 to the queries 224. The intelligence 210 then analyzes this retrieved sensor data to make decisions 228 about vehicle motion that are communicated to one or more other vehicle subsystems 232. The motion planning intelligence 210 can also issue shot list tasking commands 222 to the intelligent ladar system 206 to exercise control over where and when the ladar pulses 260 are targeted. As an improvement over conventional motion planning systems, the intelligent ladar system 206 also provides a notification to the sensor data ingest interface 208 that notifies the motion planning system 202 about a detected threat or other anomaly. This notification can take the form of a priority flag 250 that accompanies the ladar frames data 220. Together, the priority flag 250 and ladar frames data 220 can serve as a "fast" path notification 252 for the motion planning intelligence 210. This is in contrast to the "slow" path 254 whereby the motion planning intelligence makes decisions 228 only after new ladar frames data 220 have been ingested and stored in the sensor data repository 230 and retrieved/processed by the motion planning intelligence 210. If intelligence within the intelligent ladar system 206 determines that a threat might be present within the ladar frames data 220, the intelligent ladar system 206 can set the priority flag 250 to "high" or the like, whereupon the motion planning system is able to quickly determine that the ladar frames data 220 accompanying that priority flag 250 is to be evaluated on an expedited basis. Thus, the priority flag 250 can serve as a vector interrupt that interrupts the normal processing queue of the motion planning intelligence 210.

The priority flag 250 can take any of a number of forms. For example, the priority flag can be a simple bit value that is asserted "high" when a threat is detected by the intelligent ladar system 206 and asserted "low" when no threat is detected. A "high" priority flag 250 would inform the sensor data ingest interface 208 and motion planning intelligence 210 that the ladar frames data 220 which accompanies the "high" priority flag 250 is to be considered on a priority basis (e.g., immediately, as the next frame(s) to be considered, and the like). The priority flag 250 can be provided to the motion planning system 202 as a separate signal that is timed commensurately with the ladar frames data 220, or it can be embedded within the ladar frames data 220 itself. For example, the intelligent ladar system 206 can include a header or wrapper with the frames of ladar data when it communicates the ladar frames data 220 to the motion planning system 202. This header/wrapper data can include priority flag 250. The header/wrapper can be structured in accordance with a communication protocol shared between the intelligent ladar system 206 and the motion planning system 202 to permit effective data communication between the two.

Further still, a practitioner may choose to implement a priority flag 250 that communicates more than just the existence of a priority event. The priority flag 250 may also be configured to encode a type of priority event. For example, if the intelligent ladar system 206 is able to detect and distinguish between different types of threats/anomalies, the intelligent ladar system 206 can encode the detected threat/anomaly type in a multi-bit priority flag 250. For example, if the intelligent ladar system 206 is able to identify 4 different types of threats/anomalies, the priority flag 250 can be represented by 2 bits. This information about the type of threat/anomaly could then be used by the motion planning intelligence 210 to further enhance and/or accelerate its decision-making.

The sensor data ingest interface 208 can thus be configured to (1) store ladar frames 220 in sensor data repository 230 via the "slow" path 254 (to keep the repository 230 current), and (2) pass ladar frames 220 directly to the motion planning intelligence 210 via the "fast" path 252 if so indicated by the priority flag 250. To accomplish this, the interface 208 can include logic that reads the incoming priority flag 250 from the intelligent ladar system 206. If the priority flag has the appropriate bit (or bits) set, then the sensor data ingest interface 208 passes the accompanying ladar frames 220 to the motion planning intelligence 210. The priority flag 250 (or a signal derived from the priority flag 250) can also be passed to the motion planning intelligence 210 by the sensor data ingest interface 208 when the priority flag 250 is high.

The motion planning intelligence 210 can include logic for adjusting its processing when the priority flag 250 is asserted. For example, the motion planning intelligence 210 can include buffers for holding processing states and allowing context switching in response to vector interrupts as a result of the priority flag 250. To facilitate such processing, the motion planning intelligence 210 can include a threaded stack manager that allows for switching between different threads of processing (or simultaneous thread processing) to permit the motion planning intelligence 210 to quickly focus on newly detected threats or anomalies.

Figure 3A:
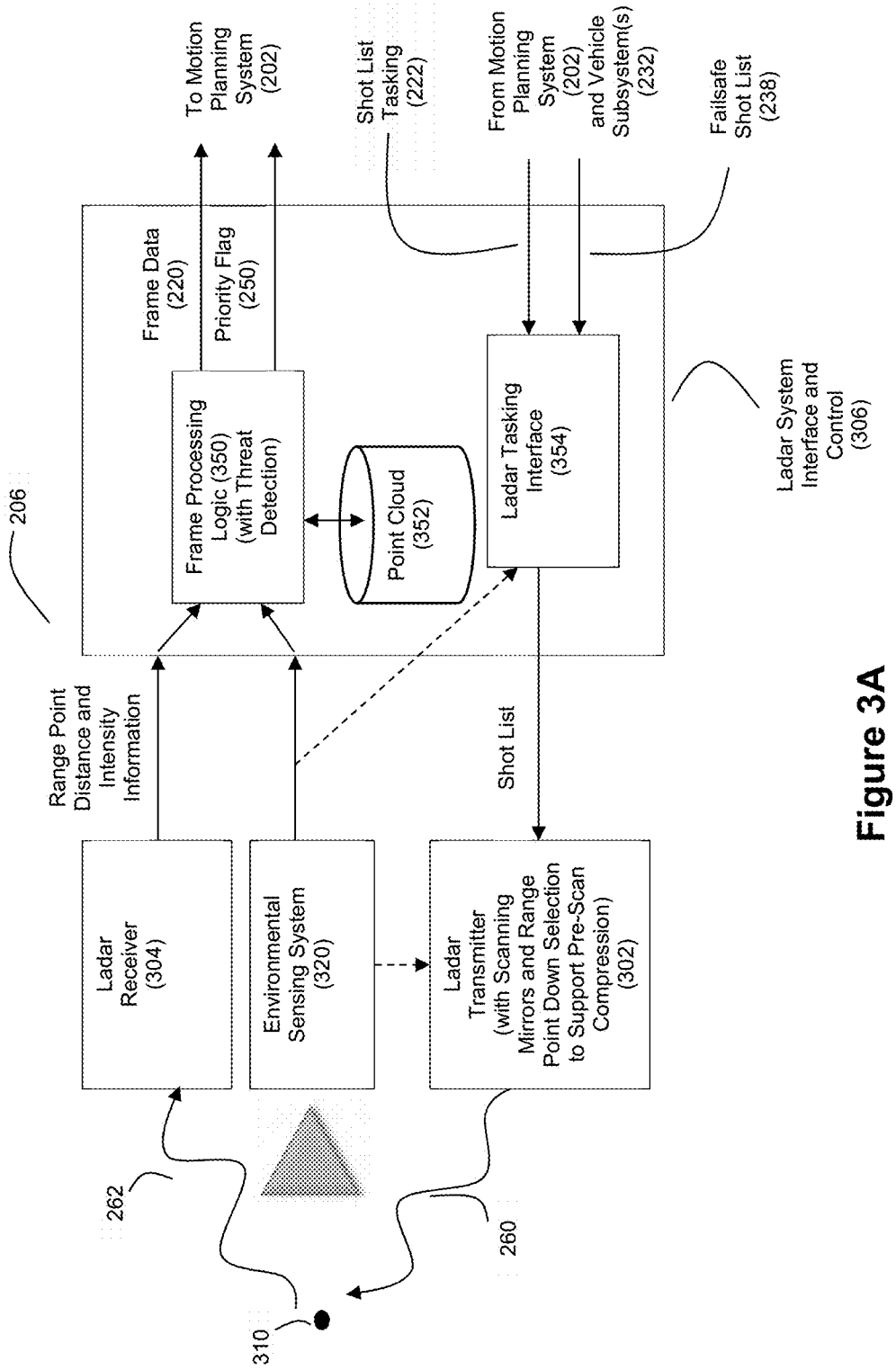
FIG. 3A discloses an example embodiment of an intelligent ladar system that can provide fast path notifications regarding threat detections.

FIG. 3A depicts an example embodiment for the intelligent ladar system 206. The intelligent ladar system 206 can include a ladar transmitter 302, ladar receiver 304, and a ladar system interface and control 306. The ladar system 206 may also include an environmental sensing system 320 such as a camera. An example of a suitable ladar system with this architecture is disclosed in the above-referenced and incorporated patent applications.

The ladar transmitter 304 can be configured to transmit a plurality of ladar pulses 260 toward a plurality of range points 310 (for ease of illustration, a single such range point 310 is shown in FIG. 3A).

In example embodiments, the ladar transmitter 302 can take the form of a ladar transmitter that includes scanning mirrors. Furthermore, in an example embodiment, the ladar transmitter 302 uses a range point down selection algorithm to support pre-scan compression (which can be referred herein to as "compressive sensing"). Such an embodiment may also include the environmental sensing system 320 that provides environmental scene data to the ladar transmitter 302 to support the range point down selection (see the dashed lines coming from the output of the environmental sensing system 320 shown in FIG. 3A). Control instructions will instruct a laser source within the ladar transmitter 302 when to fire, and will instruct the transmitter mirrors where to point. Example embodiments of such ladar transmitter designs can be found in the above-referenced and incorporated patent applications. Through the use of pre-scan compression, such a ladar transmitter 302 can better manage bandwidth through intelligent range point target selection. Moreover, this pre-scan compression also contributes to reduced latency with respect to threat detection relative to conventional ladar systems because fewer range points need to be targeted and shot in order to develop a "picture" of the scene, which translates to a reduced amount of time needed to develop that "picture" and act accordingly.

A ladar tasking interface 354 within the system interface and control 306 can receive shot list tasking 222 from the motion planning system 202. This shot list tasking 222 can define a shot list for use by the ladar transmitter 302 to target ladar pulses 260 toward a plurality of range points 310 within a scan area. Also, the motion planning intelligence 210 (see FIG. 2) can receive feedback 234 from one or more vehicle subsystems 232 for use in the obstacle detection and motion planning process. Intelligence 210 can use this feedback 234 to help guide the formulation of queries 224 into the sensor data repository 230 and/or shot list tasking 222 for the intelligent ladar system 206. Furthermore, the vehicle subsystem(s) 232 can provide a failsafe shot list 238 to the motion planning intelligence 210 for passing on to the intelligent ladar system 206. Together, the shot list tasking 222 and failsafe shot list 238 can serve as an "emergency" notification path 236 for the intelligent ladar system 206. This is in contrast to the queries 224 whereby the motion planning intelligence 210 sends and stores vehicle subsystems 232 data in the sensor data repository 230. As an example, failsafe shots might arise from vehicle subsystem self diagnostic failures. For example if the GPS readings for the vehicle are errant, or the odometer is malfunctioning, the ladar system 206 can be used to recalibrate and/or assume speed and location provisioning for the vehicle until it can safely extract itself from traffic. Another example of failsafe shots might be from the shock absorbers experiencing heavy torque. A shot list can provide independent assessment of pitch yaw and roll experienced from a transient road depression.

Ladar receiver 304 receives a reflection 262 of this ladar pulse from the range point 310. Ladar receiver 304 can be configured to receive and process the reflected ladar pulse 262 to support a determination of range point distance [depth] and intensity information. In addition, the receiver 304 can determine spatial position information [in horizontal and vertical orientation relative to the transmission plane] by any combination of (i) prior knowledge of transmit pulse timing, and (ii) multiple detectors to determine arrival angles. An example embodiment of ladar receiver 304 can be found in the above-referenced and incorporated patent applications.

The range point data generated by the ladar receiver 304 can be communicated to frame processing logic 350. This frame processing logic 350 can be configured to build ladar frames 220 from the range point data, such as from a set of range point returns in a sampled region of a field of view.

Techniques such as frame differencing, from historical point cloud information, can be used. The frame(s) generated along this path can be very sparse, because its purpose is to detect threats. For example if the task at hand is ensuring that no one is violating a red light at an intersection (e.g., moving across the intersection in front of a ladar-equipped car), a frame can simply be a tripwire of range points set to sense motion across the road leading up to the intersection.

As an example, FIG. 3A shows frame processing logic 350 as being present within the system interface and control 306. However, it should be understood that this frame processing logic 350 could be deployed elsewhere, such as within the ladar receiver 304 itself.

The frame processing logic 350 may also include threat detection logic in order to provide the ladar system 206 with sufficient intelligence for collaborating with the motion planning system 202 regarding potential threats/anomalies. As part of this threat detection, the frame processing logic 350 can build a point cloud 352 from the range point data received from the ladar receiver 304. The point cloud 352 can be an aggregation of points in space, denoted as a function of angles, range, and intensity, which are time-stamped within a framed field of regard, stored historically, and tracked. Accordingly, the point cloud 352 can include historical data such as geometric position, intensity, range extent, width, and velocity for prior range point returns and sensor data (and object data derived therefrom). An example of using a point cloud 352 to perceive threats would be to look at the time history of point cloud objects. A vehicle that is erratically swerving, for example, is a threat best revealed by looking at the point cloud "wiggle" around the object representing said vehicle. The point cloud 352 could be queried for as long back in time as the vehicle's ladar field of view intersects past collected data. Thus, the point cloud 352 can serve as a local repository for sensor data that can be leveraged by the ladar system 206 to assess potential threats/anomalies. Furthermore, the point cloud 352 can also store information obtained from sensors other than ladar (e.g., a camera).

The threat detection intelligence can be configured to exploit the point cloud 352 and any newly incoming range point data (and/or other sensor data) to determine whether the field of view as detected by the ladar system 206 (and/or other sensor(s)) includes any threats or anomalies. To perform this processing, the threat detection intelligence can employ state machines that track various objects in a scene over time to assess how the locations and appearance (e.g., shape, color, etc.) change over time. Based on such tracking, the threat detection intelligence can make a decision regarding whether the priority flag 250 should be set "high" or "low". Examples of various types of such threat detection are described in connection with FIG. 8 below.

Figure 4:
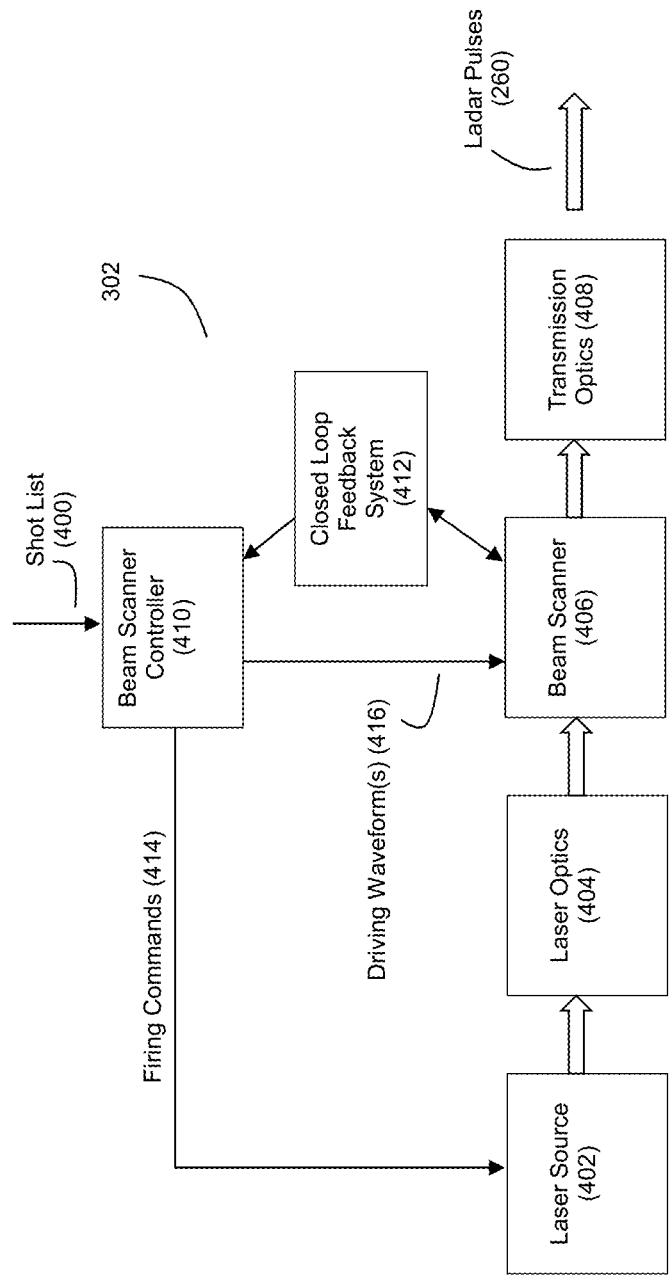
FIG. 4 discloses an example embodiment of a ladar transmitter subsystem for use in an intelligent ladar system such as that shown by FIG. 3A or 3B.

FIG. 4 depicts an example embodiment for the ladar transmitter 302. The ladar transmitter 302 can include a laser source 402 in optical alignment with laser optics 404, a beam scanner 406, and transmission optics 408. These components can be housed in a packaging that provides a suitable shape footprint for use in a desired application. For example, for embodiments where the laser source 402 is a fiber laser or fiber-coupled laser, the laser optics 404, the beam scanner 406, and any receiver components can be housed together in a first packaging that does not include the laser source 402. The laser source 402 can be housed in a second packaging, and a fiber can be used to connect the first packaging with the second packaging. Such an arrangement permits the first packaging to be smaller and more compact due to the absence of the laser source 402. Moreover, because the laser source 402 can be positioned remotely from the first packaging via the fiber connection, such an arrangement provides a practitioner with greater flexibility regarding the footprint of the system.

Based on control instructions, such as a shot list 400 received from system control 306, a beam scanner controller 410 can be configured to control the nature of scanning performed by the beam scanner 406 as well as control the firing of the laser source 402. A closed loop feedback system 412 can be employed with respect to the beam scanner 406 and the beam scanner controller 410 so that the scan position of the beam scanner 406 can be finely controlled, as explained in the above-referenced and incorporated patent applications.

The laser source 402 can be any of a number of laser types suitable for ladar pulse transmissions as described herein.

For example, the laser source 402 can be a pulsed fiber laser. The pulsed fiber laser can employ pulse durations of around 1-4 ns, and energy content of around 0.1-100 µJ/pulse. The repetition rate for the pulsed laser fiber can be in the kHz range (e.g., around 1-500 kHz). Furthermore, the pulsed fiber laser can employ single pulse schemes and/or multi-pulse schemes as described in the above-referenced and incorporated patent applications. However, it should be understood that other values for these laser characteristics could be used. For example, lower or higher energy pulses might be employed. As another example, the repetition rate could be higher, such as in the 10's of MHz range (although it is expected that such a high repetition rate would require the use of a relatively expensive laser source under current market pricing).

As another example, the laser source 402 can be a pulsed IR diode laser (with or without fiber coupling). The pulsed IR diode laser can employ pulse durations of around 1-4 ns, and energy content of around 0.01-10 µJ/pulse. The repetition rate for the pulsed IR diode fiber can be in the kHz or MHz range (e.g., around 1 kHz-5 MHz). Furthermore, the pulsed IR diode laser can employ single pulse schemes and/or multi-pulse schemes as described in the above-referenced and incorporated patent applications.

The laser optics 404 can include a telescope that functions to collimate the laser beam produced by the laser source 402. Laser optics can be configured to provide a desired beam divergence and beam quality. As example, diode to mirror coupling optics, diode to fiber coupling optics, and fiber to mirror coupling optics can be employed depending upon the desires of a practitioner.

The beam scanner 406 is the component that provides the ladar transmitter 302 with scanning capabilities such that desired range points can be targeted with ladar pulses 260. The beam scanner 406 receives an incoming ladar pulse from the laser source 402 (by way of laser optics 404) and directs this ladar pulse to a desired downrange location (such as a range point on the shot list) via reflections from movable mirrors. Mirror movement can be controlled by one or more driving voltage waveforms 416 received from the beam scanner controller 410. Any of a number of configurations can be employed by the beam scanner 406. For example, the beam scanner can include dual microelectromechanical systems (MEMS) mirrors, a MEMS mirror in combination with a spinning polygon mirror, or other arrangements. An example of suitable MEMS mirrors is a single surface tip/tilt/piston MEMS mirrors. By way of further example, in an example dual MEMS mirror embodiment, a single surface tip MEMS mirror and a single surface tilt MEMS mirror can be used. However, it should be understood that arrays of these MEMS mirrors could also be employed. Also, the dual MEMS mirrors can be operated at any of a number of frequencies, examples of which are described in the above-referenced and incorporated patent applications, with additional examples being discussed below. As another example of other arrangements, a miniature galvanometer mirror can be used as a fast-axis scanning mirror. As another example, an acousto-optic deflector mirror can be used as a slow-axis scanning mirror. Furthermore, for an example embodiment that employs a spiral dynamic scan pattern, the mirrors can be resonating galvanometer mirrors. Such alternative mirrors can be obtained from any of a number of sources such as Electro-Optical Products Corporation of New York. As another example, a photonic beam steering device such as one available from Vescent Photonics of Colorado can be used as a slow-axis scanning mirror. As still another example, a phased array device such as the one being developed by the DARPA SWEEPER program could be used in place of the fast axis and/or slow axis mirrors. More recently, liquid crystal spatial light modulators (SLMs), such as those offered by Boulder Nonlinear Systems, Meadowlark, and Beamco, can be considered for use. Furthermore, quantum dot SLMs have been recently proposed (see Technical University of Dresden, 2011 *IEEE Conference on Lasers and Electro-Optics*), which hold promise of faster switching times when used in example embodiments.

Also, in an example embodiment where the beam scanner 406 includes dual mirrors, the beam scanner 406 may include relay imaging optics between the first and second mirrors, which would permit that two small fast axis mirrors be used (e.g., two small fast mirrors as opposed to one small fast mirror and one long slower mirror).

The transmission optics 408 are configured to transmit the ladar pulse as targeted by the beam scanner 406 to a desired location through an aperture. The transmission optics 408 can have any of a number of configurations depending upon the desires of a practitioner. For example, the environmental sensing system 320 and the transmitter 302 can be combined optically into one path using a dichroic beam splitter as part of the transmission optics 408. As another example, the transmission optics can include magnification optics as described in the above-referenced and incorporated patent applications or descoping [e.g., wide angle] optics. Further still, an alignment pickoff beam splitter can be included as part of the transmission optics 408.

Figure 5A:
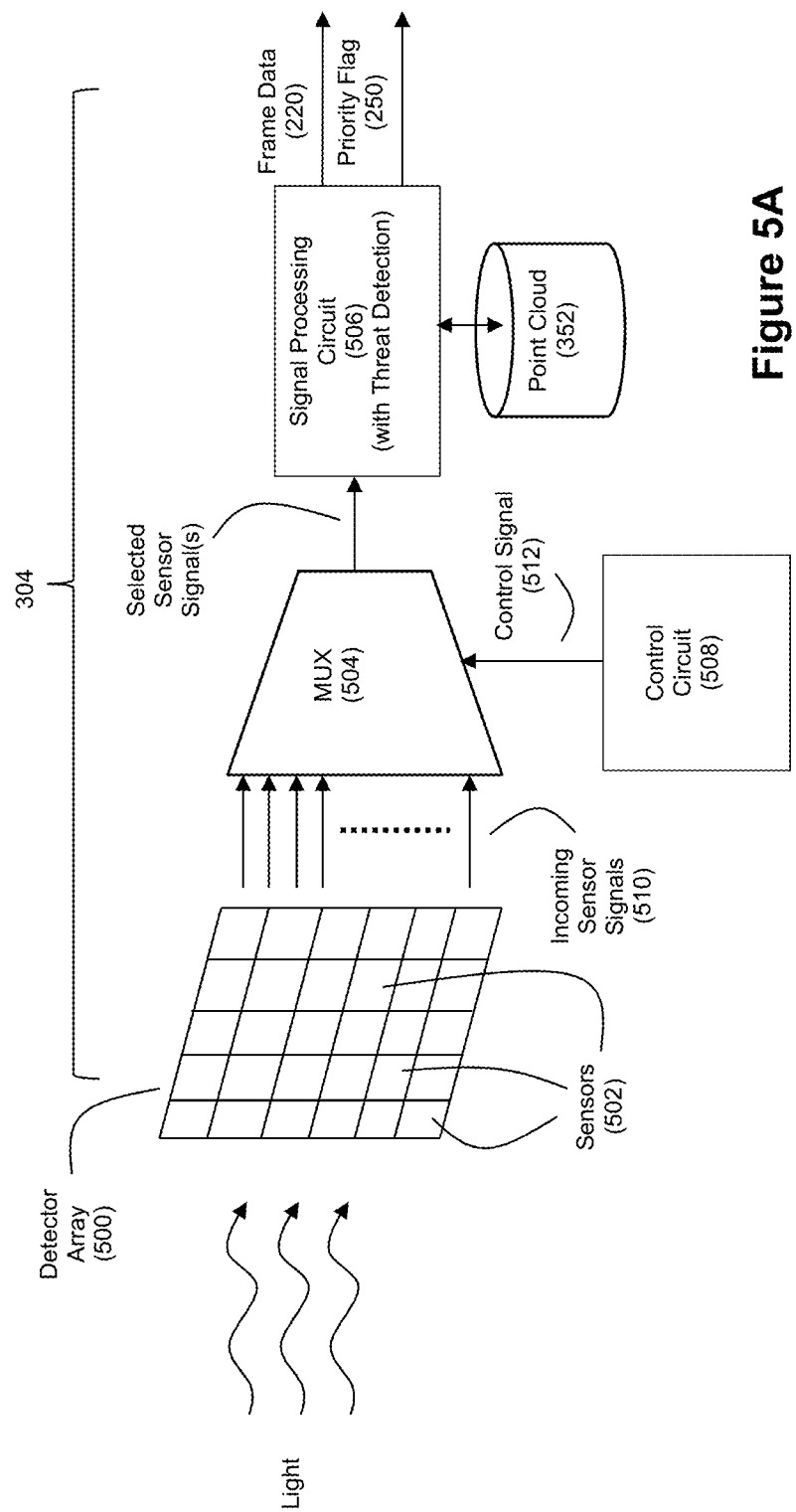
FIG. 5A discloses an example embodiment of a ladar receiver subsystem for use in an intelligent ladar system such as that shown by FIG. 3A or 3B.

FIG. 5A depicts an example embodiment for the ladar receiver 304. Readout circuitry within the ladar receiver 304 can employs a multiplexer 504 for selecting which sensors 502 within a detector array 500 are passed to a signal processing circuit 506. In an example embodiment, the sensors 502 may comprise a photodetector coupled to a pre-amplifier. In an example embodiment, the photodetector could be a PIN photodiode and the associated pre-amplifier could be a transimpedance amplifier (TIA). In the example embodiment depicted by FIG. 5A, a detector array 500 comprising a plurality of individually-addressable light sensors 502 is used to sense ladar pulse reflections 262. Each light sensor 502 can be characterized as a pixel of the array 500, and each light sensor 502 will generate its own sensor signal 510 in response to incident light. Thus, the array 500 can comprise a photodetector with a detection region that comprises a plurality of photodetector pixels. The embodiment of FIG. 5A employs a multiplexer 504 that isolates the incoming sensor signals 510 that are passed to the signal processing circuit 506 at a given time. In doing so, the embodiment of FIG. 5A provides better received SNR, especially against ambient passive light, relative to ladar receiver designs such as those disclosed by U.S. Pat. No. 8,081,301 where no capability is disclosed for selectively isolating sensor readout. Thus, the signal processing circuit 506 can operate on a single incoming sensor signal 510 (or some subset of incoming sensor signals 510) at a time.

The multiplexer 504 can be any multiplexer chip or circuit that provides a switching rate sufficiently high to meet the needs of detecting the reflected ladar pulses. In an example embodiment, the multiplexer 504 multiplexes photocurrent signals generated by the sensors 502 of the detector array 500. However, it should be understood that other embodiments may be employed where the multiplexer 504 multiplexes a resultant voltage signal generated by the sensors 502 of the detector array 500. Moreover, in example embodiments where the ladar receiver 304 of FIG. 5A is paired with a scanning ladar transmitter 302 that employs pre-scan compressive sensing (such as the example embodiments employing range point down selection that are described above and in the above-referenced and incorporated patent applications), the selective targeting of range points provided by the ladar transmitter 302 pairs well with the selective readout provided by the multiplexer 504 so that the receiver 304 can isolate detector readout to pixels of interest in an effort to improve SNR.

A control circuit 508 can be configured to generate a control signal 512 that governs which of the incoming sensor signals 510 are passed to signal processing circuit 506. In an example embodiment where the ladar receiver 304 is paired with a scanning ladar transmitter 302 that employs pre-scan compressive sensing according to a scan pattern, the control signal 512 can cause the multiplexer 504 to selectively connect to individual light sensors 502 in a pattern that follows the transmitter's shot list (examples of the shot list that may be employed by such a transmitter 302 are described in the above-referenced and incorporated patent applications). The control signal 512 can select sensors 502 within array 500 in a pattern that follows the targeting of range points via the shot list. Thus, if the transmitter 302 is targeting pixel x,y in the scan area with a ladar pulse 260, the multiplexer 504 can generate a control signal 512 that causes a readout of pixel x,y from the detector array 500.

It should be understood that the control signal 512 can be effective to select a single sensor 502 at a time or it can be effective to select multiple sensors 502 at a time in which case the multiplexer 504 would select a subset of the incoming sensor signals 510 for further processing by the signal processing circuit 506. Such multiple sensors can be referred to as composite pixels (or superpixels). For example, the array 500 may be divided into a J×K grid of composite pixels, where each composite pixel is comprised of X individual sensors 502. Summer circuits can be positioned between the detector array 500 and the multiplexer 504, where each summer circuit corresponds to a single composite pixel and is configured to sum the readouts (sensor signals 510) from the pixels that make up that corresponding composite pixel. It should also be understood that a practitioner may choose to include some pre-amplification circuitry between the detector array 500 and the multiplexer 504 if desired.

If desired by a practitioner, the threat detection intelligence and point cloud 352 discussed above can be included as part of the signal processing circuit 506. In such a case, the signal processing circuit 506 can generate the frame data 220 and corresponding priority flag 250.

Figure 5B:
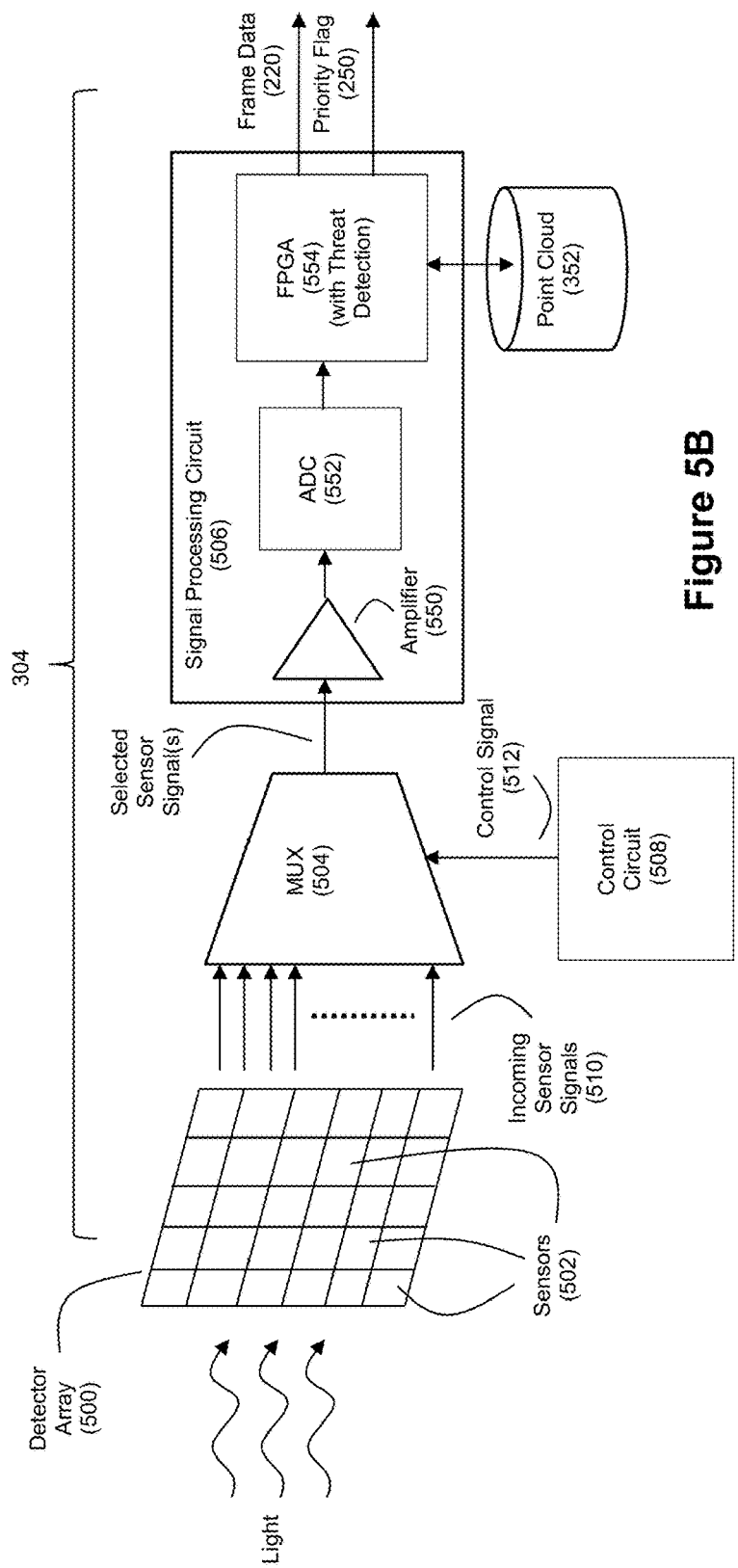
FIG. 5B discloses another example embodiment of a ladar receiver subsystem for use in an intelligent ladar system such as that shown by FIG. 3A or 3B.

In the example of FIG. 5B, the signal processing circuit 506 comprises an amplifier 550 that amplifies the selected sensor signal(s), an analog-to-digital converter (ADC) 552 that converts the amplified signal into a plurality of digital samples, and a field programmable gate array (FPGA) 554 that is configured to perform a number of processing operations on the digital samples to generate the processed signal data. It should be understood that the signal processing circuit 506 need not necessarily include an FPGA 554; the processing capabilities of the signal processing circuit 506 can be deployed in any processor suitable for performing the operations described herein, such as a central processing unit (CPU), micro-controller unit (MCU), graphics processing unit (GPU), digital signal processor (DSP), and/or application-specific integrated circuit (ASIC) or the like. However, the inventors note that an FPGA 554 is expected to provide suitably high performance and low processing latency that will beneficially contribute to low latency threat detection.

The amplifier 550 can take the form of a low noise amplifier such as a low noise RF amplifier or a low noise operational amplifier. The ADC 552 can take the form of an N-channel ADC.

The FPGA 554 includes hardware logic that is configured to process the digital samples and ultimately return information about range and/or intensity with respect to the range points based on the reflected ladar pulses. In an example embodiment, the FPGA 554 can be configured to perform peak detection on the digital samples produced by the ADC 552. In an example embodiment, such peak detection can be effective to compute range information within +/−10 cm. The FPGA 554 can also be configured to perform interpolation on the digital samples where the samples are curve fit onto a polynomial to support an interpolation that more precisely identifies where the detected peaks fit on the curve. In an example embodiment, such interpolation can be effective to compute range information within +/−5 mm.

Moreover, the FPGA 554 can also implement the threat detection intelligence discussed above so that the signal processing circuit 506 can provide frame data 220 and priority flag 250 to the motion planning system 202.

When a receiver 304 which employs a signal processing circuit 506 such as that shown by FIG. 5B is paired with a ladar transmitter 302 that employs compressive sensing as described above and in the above-referenced and incorporated patent applications, the receiver 304 will have more time to perform signal processing on detected pulses because the ladar transmitter would put fewer ladar pulses in the air per frame than would conventional transmitters, which reduces the processing burden placed on the signal processing circuit 506. Moreover, to further improve processing performance, the FPGA 554 can be designed to leverage the parallel hardware logic resources of the FPGA such that different parts of the detected signal are processed by different hardware logic resources of the FPGA at the same time, thereby further reducing the time needed to compute accurate range and/or intensity information for each range point.

Furthermore, the signal processing circuit of FIG. 5B is capable of working with incoming signals that exhibit a low SNR due to the signal processing that the FPGA 554 can bring to bear on the signal data in order to maximize detection. The SNR can be further enhanced by varying the pulse duration on transmit. For example, if the signal processing circuit reveals higher than usual clutter (or the presence of other laser interferers) at a range point, this information can be fed back to the transmitter for the next time that the transmitter inspects that range point. A pulse with constant peak power but extended by a multiple of G will have G times more energy. Simultaneously, it will possess G times less bandwidth. Hence, if we low pass filter digitally, the SNR is expected to increase by $G^{1/2}$, and the detection range for fixed reflectivity is expected to increase by $G^{1/4}$. This improvement is expected to hold true for all target-external noise sources: thermal current noise (also called Johnson noise), dark current, and background, since they all vary as $\sqrt{G}$. The above discussion entails a broadened transmission pulse. Pulses can at times be stretched due to environmental effects. For example, a target that has a projected range extent within the beam diffraction limit will stretch the return pulse. Digital low pass filtering is expected to improve the SNR here by $\sqrt{G}$ without modifying the transmit pulse. The transmit pulse duration can also be shortened, in order to reduce pulse stretching from the environment. Pulse shortening, with fixed pulse energy, also increases SNR, provided the peak power increase is achievable. The above analysis assumes white noise, but the practitioner will recognize that extensions to other noise spectrum are straightforward.

While examples of suitable designs for ladar transmitter 302 and ladar receiver 304 are disclosed in the above-referenced and incorporated patent applications, the inventors further note that practitioners may choose alternate designs for a ladar transmitter and ladar receiver for use with intelligent ladar system 206 if desired.

Figure 3B:
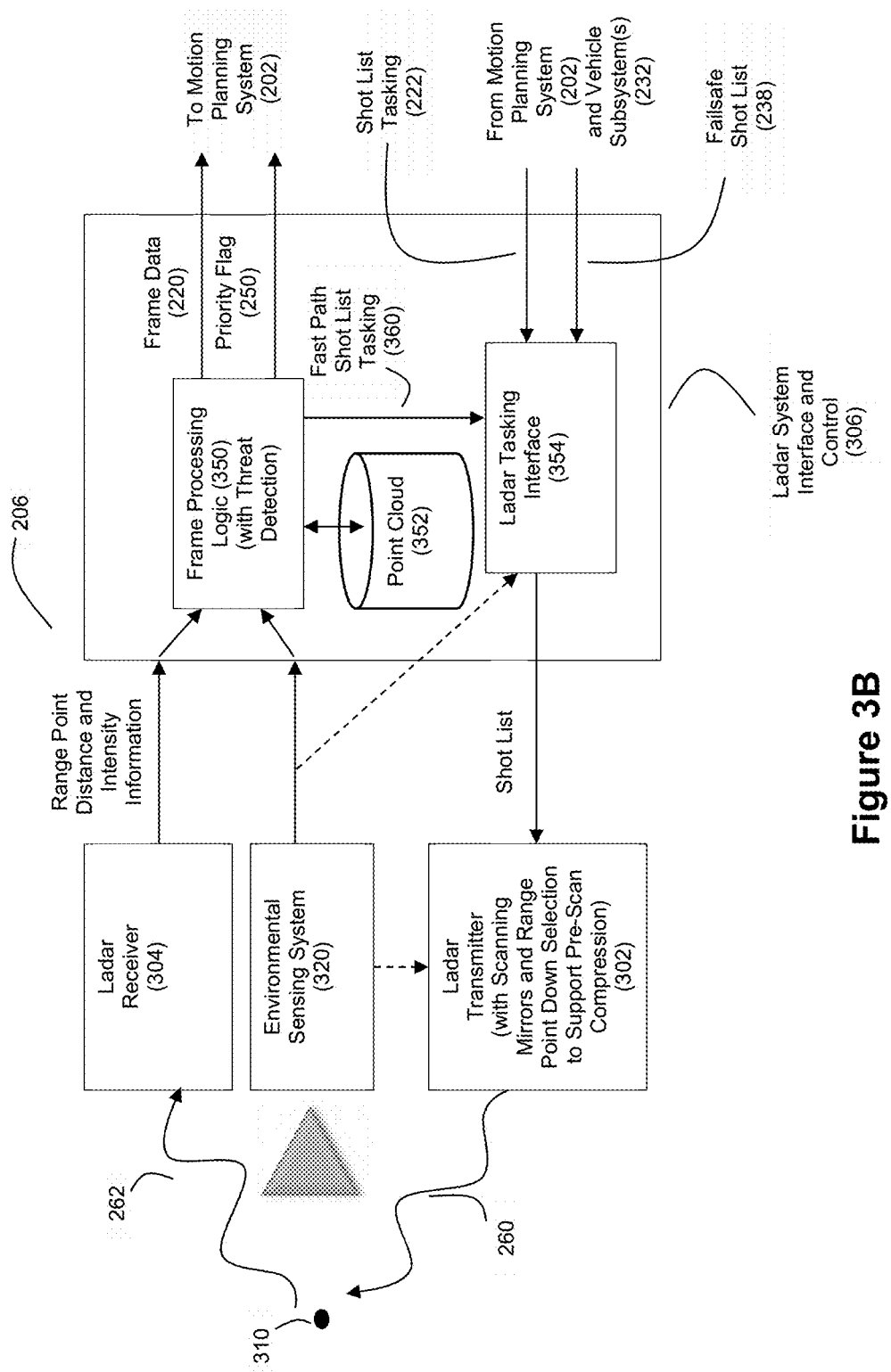
FIG. 3B discloses another example embodiment of an intelligent ladar system that can provide fast path notifications regarding threat detections.

FIG. 3B discloses another example embodiment of an intelligent ladar system 206. In the example of FIG. 3B, the ladar system 206 also includes a "fast" path 360 for shot list tasking. As indicated above, the threat detection intelligence 350 can be configured to detect regions within a field of view that correspond to a potential threat or anomaly. In order to obtain more information from this region of concern, it is desirable to target the ladar transmitter 302 onto that region and fire additional ladar pulses 260 toward this region. However, if the motion planning system 202 is the entity that makes decisions about where to target the ladar transmitter 302, the inventors note that a fair amount of latency will be introduced into the targeting of the ladar transmitter 302 because the ladar transmitter will need to wait for the information to be communicated to, ingested by, and considered by the motion planning system 202 before the motion planning system 202 can make a decision about which region(s) should be targeted by the ladar transmitter 302. Further still, latency would be added while the ladar transmitter awaits the transmission of these targeting instructions from the motion planning system 202. The fast path 360, shown by FIG. 3B, bypasses this longer decision-making path.

With FIG. 3B, when the threat detection intelligence within the frame processing logic 350 detects an area of concern with the scan area/field of view, the threat detection intelligence can re-task the ladar transmitter 302 by identifying the area of concern to the ladar tasking interface 354 via fast path 360. This direct feed into the ladar tasking interface 354 allows the ladar tasking interface 354 to quickly insert new shots into the pipelined shot list 400 that is used to control the targeting of the ladar transmitter 302. An example of how the new range shots might be obtained can be as follows: suppose that motion is sensed either from a video camera or from the ladar point cloud in a region close enough to the vehicle's planned path to be a threat. Then, the new shots can be identified as the set of voxels that are both (i) near the sensed motion's geometric location (ii) along the planned trajectory of the vehicle, and (iii) likely to resolve the nature of the sensed motion. This last item (iii) is best considered in the context of detecting an animal crossing the road—is the motion from leaves or an animal in transit? A motion model for both the animal and diffuse vegetation motion can be used to assess the best shot position to separate these hypotheses.

Two examples of how new shots can be allocated by the system can include: (1) threat detection within 350 tells a tasking system to target a general area of concern, and probe shots are defined by the tasking system to build out the scene (for example, an ambiguous blob detection from radar could trigger a list of probe shots to build out the threat), and (2) threat intelligence receives a specific dataset from a source that gives more clarity to the threat in order to decide on specific set of range points (for example, a camera provides contrast information or detects edges, where the high contrast and/or edge pixels would correspond to specific range points for new shots).

Figure 6A:
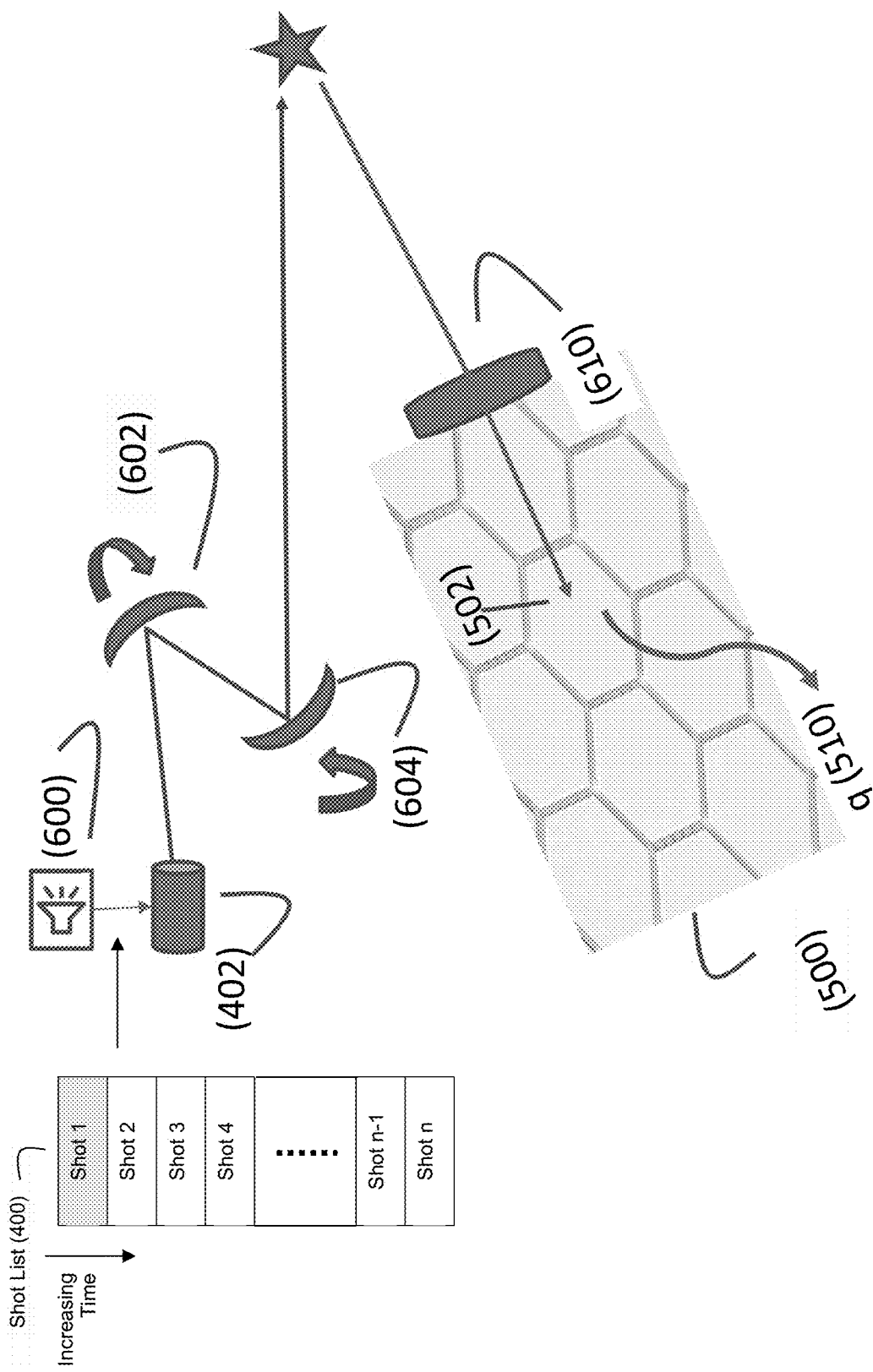
FIG. 6A-6C show examples of "fast path" ladar tasking.
Figure 6B:
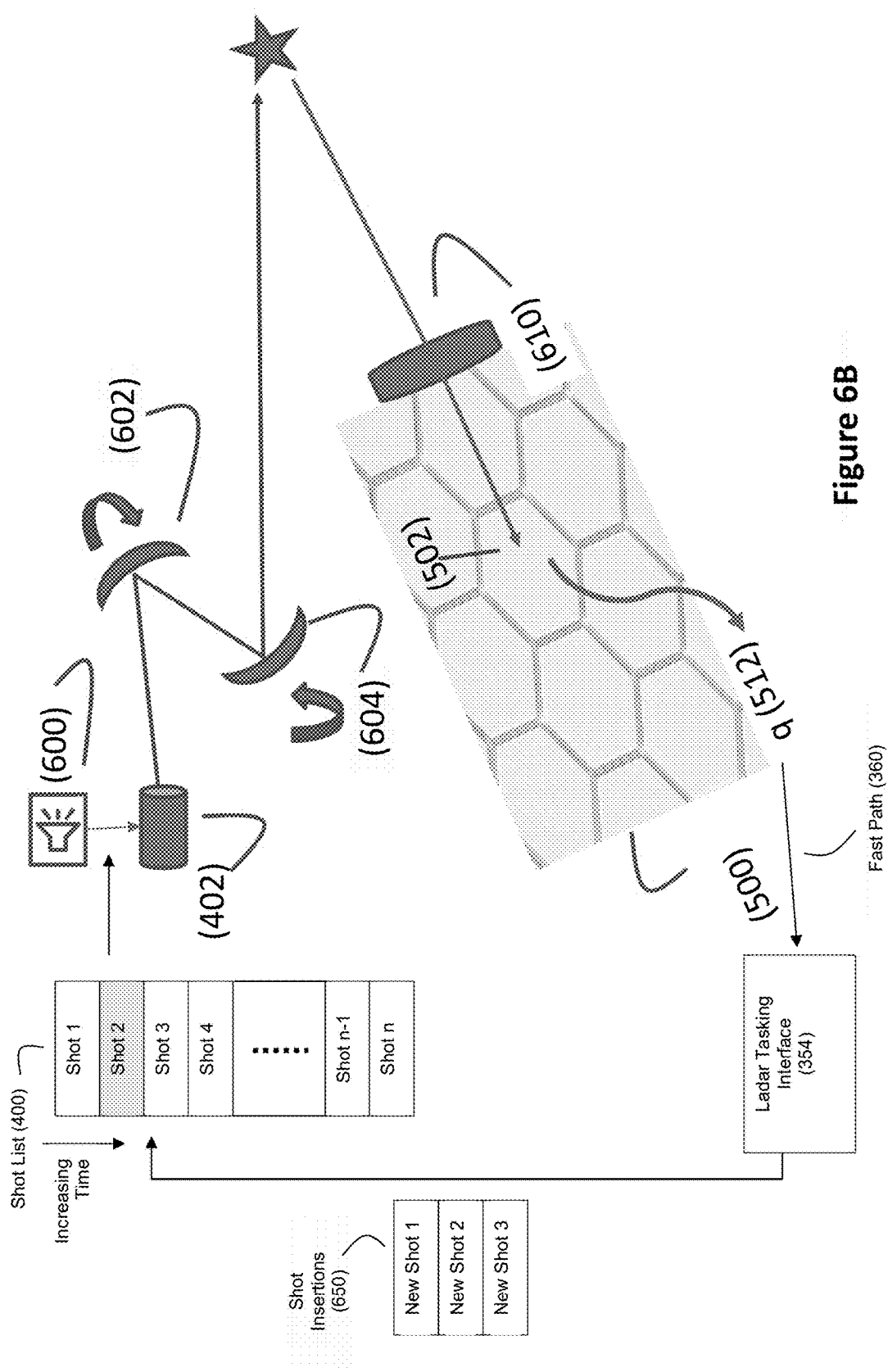
Figure 6C:
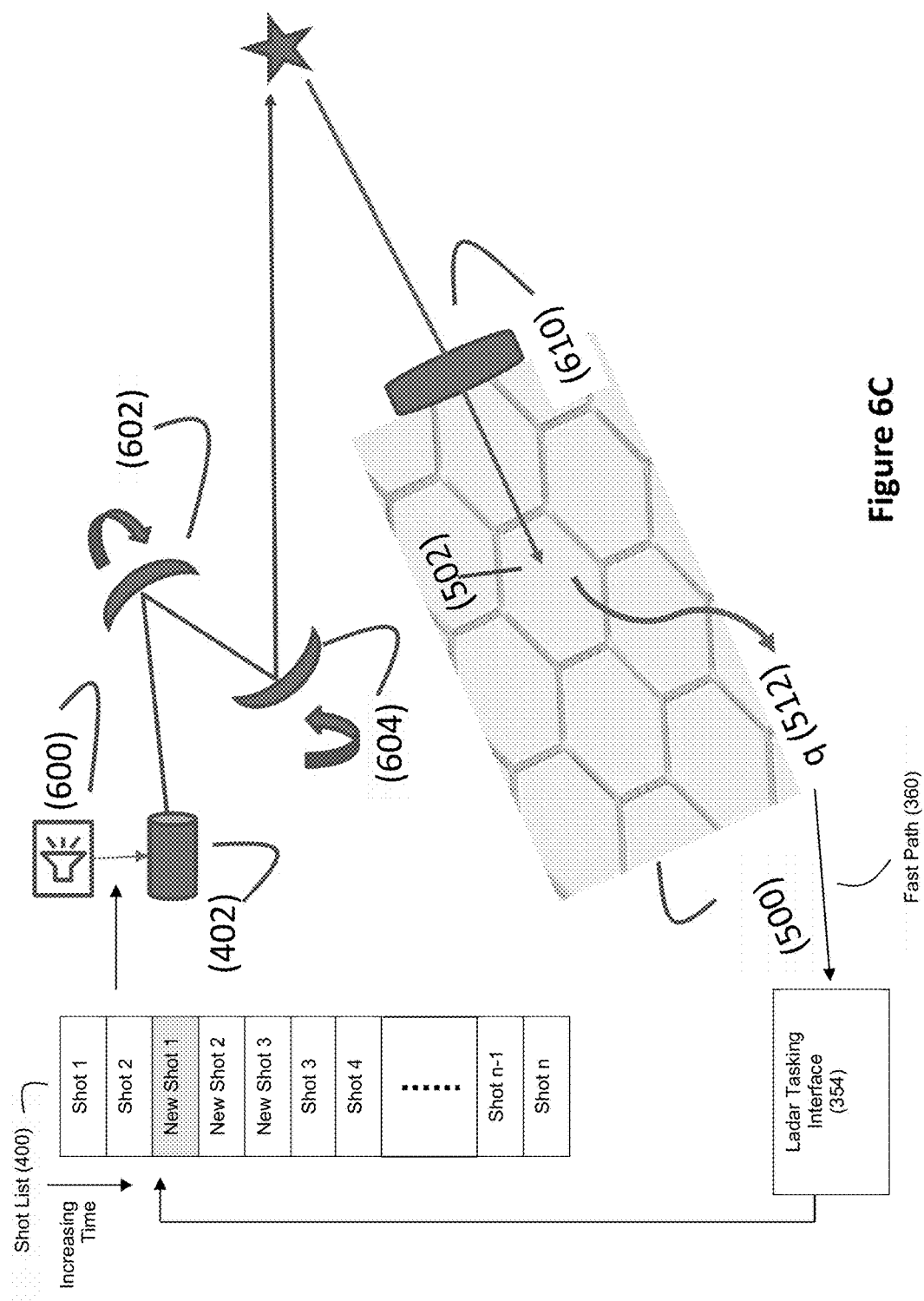

FIGS. 6A-6C depict examples of how new shots can be inserted into a shot list 400 via the fast path 360. FIG. 6A shows how a shot list 400 is used by a scheduler 600 to control the targeting of range points (see the star in FIG. 6A which represents a targeted range point) via scanning mirrors 602 and 604. The shot list 400 comprises a sequence of shots to be fired by the ladar transmitter 302. Each shot on shot list can be identified by coordinates within the scan area for the targeted range points or other suitable mechanisms for informing the ladar transmitter as to which range points are to be targeted (e.g., edges detect in an image). For example, one might have a standard scan pattern to maintain synoptic knowledge of the environment in perceived non-threatening conditions, and shot list 400 could represent these shots. For example, raster scan or foveated patterns could be used to probe a scene in order to detect hidden threats. To target Shot 1 from the shot list 400, laser source 402 is fired when the scanning mirrors 602 and 604 are positioned such that the ladar pulse will be projected toward the targeted range point for Shot 1. The ladar pulse will then strike the range point and reflect back upon the detector array 500 (via a receiver lens 610 or the like). One or more sensors 502 of the array 500 will then produce a signal 510 (e.g. a readout current) that can be processed to learn information about the targeted range point.

FIG. 6B shows how this signal 510 can be leveraged to control re-tasking of the ladar transmitter 302 via the fast path 360. With FIG. 6B, Shot 2 from the shot list 400 is used to control the targeting and firing of the ladar transmitter 302. Meanwhile, if the threat detection intelligence determines that new ladar shots are needed to gain more information about a potential threat/anomaly, the ladar tasking interface 354 can generate one or more ladar shot insertions 650. These shot list insertions 650 can then be inserted into shot list 400 as the next sequence of shots to be taken by the ladar transmitter 302 (see FIG. 6C). Accordingly, the ladar transmitter 302 can be quickly re-tasked to target regions of interest that are found by the ladar system 206's threat detection intelligence. It is also possible for the motion planner itself to query the ladar system, which a practitioner may choose to define as over-riding the interrupt that was self-generated by the ladar system. For example, vehicle pitch or yaw changes could cue a foveated scan corresponding to the determined direction of motion.

Figure 7:
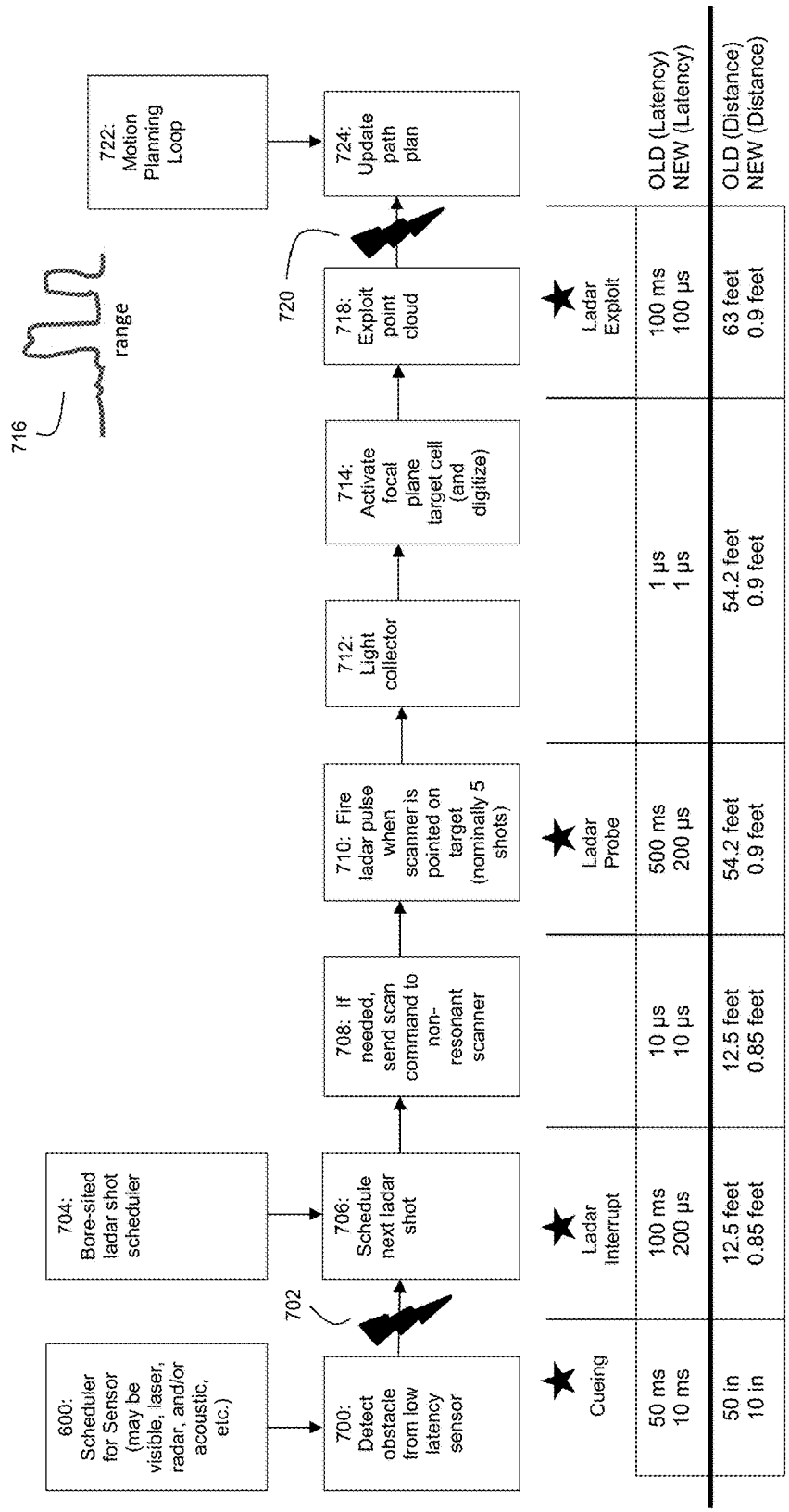
FIG. 7 shows an example sequence of motion planning operations for an example embodiment together with comparative timing examples relative to a conventional system.

FIG. 7 shows an example sequence of motion planning operations for an example embodiment together with comparative timing examples relative to a conventional system. Current conventional ladar systems employ raster scans, which generate point clouds in batch mode and suffer from high latency (as do video cameras in isolation). FIG. 7 shows a scenario where a conventional motion planner derived from a raster scan ladar system will have scene data interpretation delayed by 60+ feet of closure with respect to the vehicle moving at 100 kilometers per hour (kph) using U.S. Department of Transportation data on braking response times, even with generous assumptions, whereas an example embodiment of the intelligent ladar and motion planning system disclosed herein is expected to have less than one foot of position latency. In other words, a motion planner that uses the inventive techniques described herein is expected to obtain behavioral information about objects in the scene of potential threat when the objects have moved only one foot closer to the vehicle, versus 60+ feet as would be the case with a conventional motion planning system. FIG. 7 discloses various steps in a motion planning operation, and the lower portion of FIG. 7 discloses estimates regarding latency and distance required for each step of the sequence (where the numbers presented are in terms of cumulative time and distance) for the conventional raster scan ladar approach (labeled as "OLD") and the inventive techniques described herein (labeled as "NEW"). Accordingly, FIG. 7 discloses how example embodiments of the invention are expected to provide microsecond probing and exploitation corresponding to millisecond response time updating of motion planning, an important capability for autonomous vehicles to be able to counter rare, but potentially fatal, emerging obstacles, such as deer crossing, red-stop-sign moving violators at intersections, and motorcycle vehicle passing. All three of these may or will require motion planning updates at millisecond time scales if accidents are to be reliably and demonstrably avoided.

Recent advances by Luminar have shown that ladar can achieve detection ranges, even against weak 10% reflectivity targets, at 200 m+ ranges, when properly designed. This is helpful for providing response times and saving lives. For example, consider a motorcycle, detected at 200 m. This range for detection is useful, but in even modest traffic the motorcycle will likely be occluded at some time before it nears or passes the vehicle. For example, suppose the motorcycle is seen at 200 m, and then is blocked by cars between it and a ladar-equipped vehicle. Next suppose the motorcycle reappears just as the motorcycle is passing another vehicle, unaware it is on a collision course with the ladar-equipped vehicle, at 100 m range. If both it and the ladar-equipped vehicle are moving at 60 mph (about 100 kph), the closing speed is around 50 m/s. Having detected the motorcycle at 200 m will help the point cloud exploiter to reconfirm its presence when it reappears, but what about latency? If 2 seconds collision warning are required in order to update motion planning and save lives there is no time to spare, every millisecond counts.

A ladar system that requires two or more scans to confirm a detection, and which updates at 100 millisecond rates will require $\frac{1}{5}^{th}$ of a second to collect data let alone sense, assess, and respond [motion plan modification]. This is where an example embodiment of the disclosed invention can provide significant technical advances in the art. Through an example embodiment, the inventors expect to reduce the "sense-to-plan modification" stage down to around 10 milliseconds (see FIG. 7). The value of this improvement is that now the ladar-equipped vehicle can respond to erratic behavior and unpredictable events, such as unobservant lane passers, at 30-50 m ranges, with one second or more to execute an evasive maneuver. At ½ second response time, which is typical for conventional pipelined raster scanned systems, this distance extends to 50 m-70 m, which is problematic because the further away the target, the more likely it will be blocked, or at low reflectivity, it will not be detected at all. Consider a second scenario, whereby a deer, a cyclist, or a vehicle blindsides the ladar-equipped vehicle by crossing the street in front of the ladar-equipped vehicle without warning. A system that scans, and confirms, every 200 ms may well fail to detect such a blindside event, let alone detect it in time for motion updating for collision avoidance. Accordingly, the speed advantage provided by an example embodiment of the disclosed invention is far more than a linear gain, because the likelihood of blindsiding collisions, whether from humans or animals, increases as less warning time is conferred.

Accordingly, the inventors believe there is a great need in the art for a system capable of motion planning updates within 200 ms or less (including processor latency), and the inventors for purposes of discussion have chosen a nominal 10 millisecond delay from "sensor-to-motion planning update" as a benchmark.

The sequence of FIG. 7 begins with a scheduler 600 for an intelligent sensor detecting an obstacle at step 702 that may impact the motion path. The intelligent sensor can be a wide field of view sensor such as the intelligent ladar system 206 that provides a cue that there is a potential, but unvalidated, danger in the environment. If the sensor is another heterogeneous sensor, not the ladar system itself, this process 200 can take on two cases in an example embodiment.

The first case is what can be called "selective sensing", whereby the scheduler 600 directs the ladar source 402, such as a direct probe case described above. In this instance, the ladar system 206 is used to obtain more detailed information, such as range, velocity, or simply better illumination, when the sensor is something like a camera [infrared or visual] or the like. In the above, we assume that an object has been identified, and the ladar system is used to improve knowledge about said object. In other words, based on the cueing, sensing shots are selected for the ladar system to return additional information about the object. In "comparative" sensing, another scheduling embodiment, the situation is more nuanced. With comparative sensing, the presence or absence of an object is only inferred after the ladar data and the video object is obtained. This is because changes in a video may or may not be associated with any one object. Shimmering of light might be due to various static objects at various distances (e.g., a non-threat), or from something such as reflections off a transiting animal's coat (e.g., a threat). For example, a change in an image frame-to-frame will quickly indicate motion, but the motion will blur the image and therefore make it difficult to assess the form and shape of the moving object. The ladar system 206 can complement the passive image sensor. By selecting the blur area for further sensing, the ladar system 206 can probe and determine a crisp 3D image. This is because the image will blur for motions around 10 Hz or so, while the ladar system 206 can sample the entire scene within 100s of nanoseconds, hence no blurring. Comparison can be performed on post-ladar image formation, to assess whether the ladar returns correspond to the blur region or static background.

As another example, the bidirectional feedback loop between two sensors (such as the ladar system and a cueing sensor) could provide requisite information for motion planning based on the inherent nature of counterbalanced data review and verification.

Selective and comparative sensing can also result from sensor self-cueing. For a selective example consider the following. Object motion is detected with a ladar system 206, and then the ladar system (if it has intelligent range point capability via compressive sensing or the like) can be tasked to surround the object/region of interest with a salvo of ladar shots to further characterize the object. For a comparative example, consider revisiting a section of road where an object was detected on a prior frame. If the range or intensity return changes (which is by definition an act of comparison), this can be called comparative sensing. Once an object has been detected, a higher perception layer, which can be referred to as "objective" sensing is needed before a reliable interrupt is to be proffered to the automotive telematics control subsystem. It desirable for the ladar system 206, to be low latency, to be able to quickly slew its beam to the cued object. This requires rapid scan (an example of which shown is in FIGS. 6A-C as a gimbaled pair of azimuth and elevation scanning mirrors, 602 and 604. Two-dimensional optical phased array ladar could be used as well, and the gimbals can be replaced by any manner of micromechanical scan mirrors. Examples of MEMS systems, being mechanical scanning, are spatial light modulators using liquid crystal such as offered by Boulder Nonlinear Systems and Beamco.

Returning to FIG. 7, step 700 detects of a potential threat, with subsequent sensor interpretation. The interpretation might be sudden motion from the side of the road into the road (e.g. a tree branch, benign, or a deer leaping in front of the ladar-equipped car, a threat). A simple video exploitation that senses motion from change detection might be used here; the available algorithm options are vast and rapidly expanding, with open source projects such as open CV leading the charge. Numerous vendors sell high-resolution cameras, with excess of one million pixels, capable of more than one hundred frames per second. With only a few frames, bulk motion along the planned path of a vehicle can be detected, so cueing can happen very fast. The first vector interrupt 702 can be to the ladar system 206 itself. In this example embodiment, the ladar scheduler 704 is interrupted and over-ridden (step 706) with a request to interrogate the object observed by the sensor at step 700. In this example, the laser is assumed to be bore-sited. The absence of parallax allows rapid transfer of coordinates from camera to laser. Next, if needed, a command is issued to, and executed by, scanners 602 and 604, to orient the laser to fire at the item of interest (step 708). A set of ladar shots is then fired (step 710) (for example, by ladar transmitter 302), and a return pulse is collected (step 712) in a photodetector and analyzed (for example, by ladar receiver 304). To further reduce latency, a selectable focal plane is employed so only the desired cell of the received focal plane is interrogated (step 714) (for example, via multiplexer 504). This streamlines read times in passing the ladar data out of the optical detector and into digital memory for analysis. When the ladar system 206 itself is the source of the original cue, this can be referred to as self cueing, as opposed to cross cueing whereby one sensor cues another.

Next a single range point pulse return (see 716) is digitized and analyzed at step 718 to determine peak, first and last returns. This operation can exploit the point cloud 352 to also consider prior one or more range point pulse returns. This process is repeated as required until the candidate threat object has been interrogated with sufficient fidelity to make a vector interrupt decision. Should an interrupt 720 be deemed necessary, the motion planning system 202 is notified, which results in the pipelined queue 722 of motion planning system 202 being interrupted, and a new path plan (and associated necessary motion) can be inserted at the top of the stack (step 724).

Taking 100 m as a nominal point of reference for our scenario, the time required from launch of pulse at step 710 to completion of range profile (see 716) is about 600 nsec since $$\frac{\frac{3}{2}10^8 \frac{m}{s}} {s} x \frac{2}{3} 10^{-6} s \sim 100 \text{ m.}$$

The lower portions of FIG. 7 show expected comparative timing and distances (cumulatively) for each stage of this process with respect to an example embodiment disclosed herein and roughly analogous stages of a conventional raster scan system. The difference is striking, with the example inventive embodiment being expect to we require less than 1 foot of motion of the obstacle versus 68 feet for the conventional system. This portion of FIG. 7 includes stars to indicate stages that are dominant sources of latency.

It is instructive to explore the source of the latency savings at each stage in the processing chain of FIG. 7.

The first stage of latency in the sensor processing chain is the time from when the cuing sensor receives the raw wavefront from a threat item to when the ladar system controller determines the direction the ladar transmitter should point to address this threat item. Since it is expected that we will need several frames from the cueing sensor to detect a threat, the time delay here is dominated by the frame time of cueing sensor. Conventionally this involves nominally 20 Hz of update rate, but can be reduced to 100 Hz with fast frame video, with a focus on regions presenting collision potential. For example, a 45-degree scan volume is expected to require only about 30%-pixel inspection for collision assessment. With embedded processors currently available operating in the 100 GOPs range (billions of operations per second), the image analysis stage for anomaly detection can be ignored in counting execution time, hence the camera collection time dominates.

The next stage of appreciable latency is scheduling a ladar shot through an interrupt (e.g., via fast path ladar shot re-tasking). The latency in placing a new shot on the top of the scheduling stack is dominated by the minimum spatial repetition rate of the laser 402. Spatial repetition is defined by the minimum time required to revisit a spot in the scene. For current conventional scanning ladar systems, this timeline is on the order of 10 Hz, or 100 msec period. For an intelligent range point, e.g., scanning ladar with compressive sensing, the minimum spatial repetition rate is dictated by the scan speed. This is limited by the mechanical slew rate of the MEMS device (or the equivalent mechanical hysteresis for thermally controlled electric scanning). 5 KHz is a rather conservative estimate for the timelines required. This stage leaves us with the object now expected to have moved an additional distance of ~13 feet with conventional approaches as compared to an expected additional distance of less than 1 foot with the example inventive embodiment. The next step is to compute the commands to the ladar transmitter and the execution of the setup time for the laser to fire. We deem this time to be small and comparable for both the conventional and inventive methods, being on the order of a 100 KHz rate. This is commensurate with the firing times of most automotive ladar systems. The next stage of appreciable latency in the motion planning sensor pipeline is the firing of the ladar pulses and collection of returns. Since the time of flight is negligible (around 600 nanoseconds per the aforementioned analysis), this stage is dominated time-wise by the required time between shots. Since multiple observations is expected to be needed in order to build confidence in the ladar reporting, this stage can become dominant. Indeed, for current lasers with spatial revisit of 10 Hz, 5 shots (which is expected to be a minimum number of shots needed to reliably use for safe interrupt) leads to ½ seconds of latency. With a laser capable of dedicated gaze, the 5 shots can be launched within the re-fire rate of the laser (where a re-fire time of around 200 u-sec can be used as a conservative number). After the pulses are fired, the additional latency before exploitation is minor, and is dominated by the memory paging of the ladar returns. The exact timing depends on the electronics used by the practitioner, but a typical amount, for current SDRAM, is on the order of one microsecond. Finally, the exploitation stage is needed to translate the ladar and camera imagery into a decision to interrupt the motion planner (and if so, what information to pass to the planner). This stage can be made very short with an intelligent range point ladar system. For a conventional pipelined ladar system the latency is expected to be on the order of a fixed frame, nominally 10 Hz.

Figure 9:
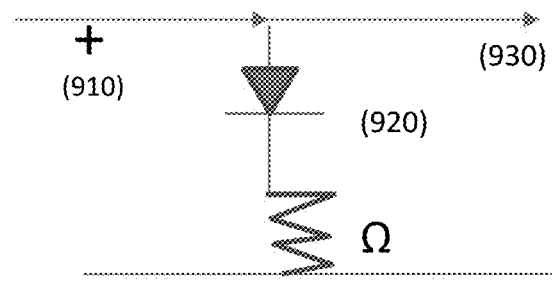
FIG. 9 discloses an example protection circuit to protect against high energy interferers.

Finally, interference is a source of latency in ladar systems, as well as radar and other active imagers (e.g., ultrasound). The reason is that data mining, machine learning, and inference may be used to ferret out such noise. To achieve low latency, motion planning can use in stride interference mitigation. One such method is the use of pulse coding as disclosed in U.S. patent application Ser. No. 62/460,520, filed Feb. 17, 2017 and entitled "Method and System for Ladar Pulse Deconfliction", the entire disclosure of which is incorporated herein by reference. Additional methods are proposed here. One source of sporadic interference is saturation of the receiver due to either "own" ladar system-induced saturation from strong returns, or those of other ladar systems. Such saturation can be overcome with a protection circuit which prevents current spikes from entering the amplifiers in the ladar receiver's photodetector circuit. Such a protection circuit can be manufactured as a metallization layer than can be added or discarded selectively during manufacturing, depending on the practitioner's desire to trade sensitivity versus latency from saturation. Such a protection circuit can be designed to operate as follows: when the current spike exceeds a certain value, a feedback circuit chokes the output; this protects the photodiode at the expense of reduced sensitivity (for example, increased noise equivalent power). FIG. 9 shows an example embodiment of such a protection circuit where a protection diode 920 is used so that when the voltage 910 at the output of the first transimpedance amplifier (for example) is exceeded, the diode 920 is activated. Upon activation of diode 920, current flows and energy is diverted from the subsequent detection circuitry 930.

Figure 8:
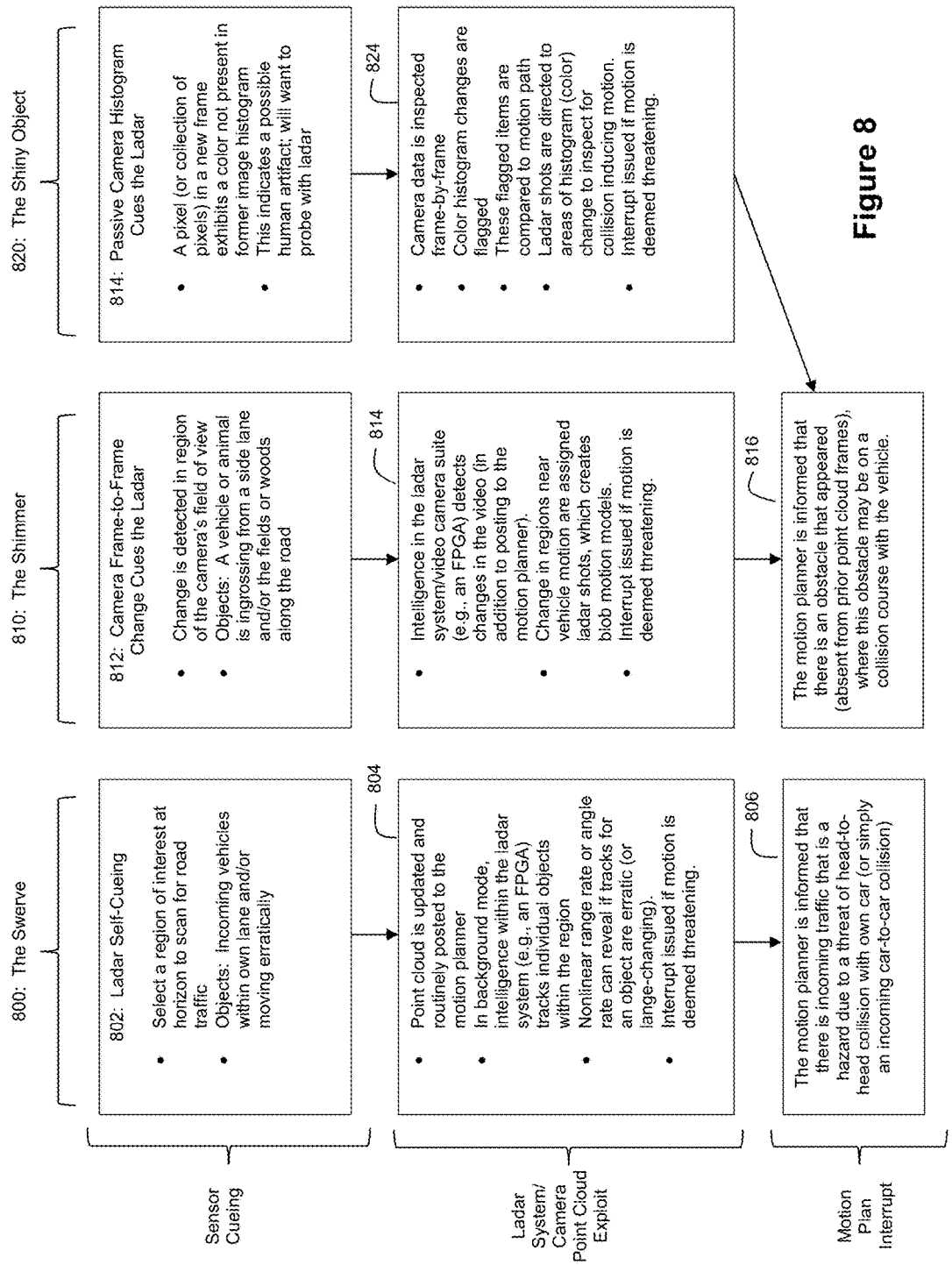
FIG. 8 discloses example process flows for collaborative detection of various kinds of threats.

FIG. 8 discloses example process flows for collaborative detection of various kinds of threats. The different columns in FIG. 8 shows different types of threats that can be detected by threat detection intelligence that is incorporated into an intelligent sensor. In this example, the types of threats that can be detected include a "swerve" 800, a "shimmer" 810, and a "shiny object" 820. It should be understood that these threat types are examples only, and the threat detection intelligence can also be configured to detect different and/or additional threats if desired by a practitioner.

The rows of FIG. 8 indicate which elements or stages of the system can be used to perform various operations in the collaborative model. The first row corresponds to sensor cueing operations. The second row corresponds to point cloud exploitation by a ladar system or other sensor intelligence (such as camera intelligence). In general the signal processing for point cloud exploitation will be executed in an FPGA, or custom processor, to keep the latency down to the level where the sensor collection times, not the processing, are the limiting factors. The third row corresponds to interrupt operations performed by a motion planning system 202.

Ladar self-cueing 802 can be used to detect a swerve event. With a swerve threat detection, the ladar system obtains ladar frame data indicative of incoming vehicles within the lane of the ladar-equipped vehicle and/or incoming vehicles moving erratically. The ladar system can employ a raster scan across a region of interest. This region of interest may be, for example, the road that the ladar-equipped vehicle is centered on, viewed at the horizon, where incoming vehicles will first be detected. In this case, we might have a vehicle that, from scan-to-scan exhibits erratic behavior. This might be (i) the vehicle is weaving in and out of lanes as evidenced by changes in the azimuth beam it is detected in, (ii) the vehicle is approaching from the wrong lane, perhaps because it is passing another vehicle, or (iii) the vehicle is moving at a speed significantly above, or below, what road conditions, and signage, warrants as safe. All three of these conditions can be identified in one or a few frames of data (see step 804).

At step 804, the point cloud 352 is routinely updated and posted to the motion planning system 202 via frame data 220. In background mode, threat detection intelligence within the ladar system 206 (e.g., an FPGA) tracks individual objects within the region. A nonlinear range rate or angle rate can reveal if tracks for an object are erratic or indicative of lane-changing. If object motion is deemed threatening, an interrupt can be issued to the motion planner (e.g., via priority flag 250).

At step 806, the motion planner is informed via the interrupt that there is incoming traffic that is a hazard due to a detected swerve condition (e.g., a threat of a head-to-head collision or simply an incoming vehicle-to-vehicle collision).

The example process flow for "shimmer" detection 810 can involve cross-cueing from another sensor as shown by step 812. Here, an embodiment is shown whereby a change is detected in a cluster of camera pixels, along the path of the ladar-equipped vehicle. This change might be due to shimmering leaves if the car is travelling through a forested area, or it could be due to a deer leaping onto the road. This camera detection can then be used to cue a ladar system for additional probing.

A ladar system can sense motion within two shots at step 814, and with a few shots it can also determine the size of the moving object. Such learning would take much longer with a passive camera alone. Accordingly, when the camera detects a change indicative of a shimmer, this can cue the ladar system to target ladar shots toward the shimmering regions. Intelligence that processes the ladar returns can create blob motion models, and these blob motion models can be analyzed to determine whether a motion planning interrupt is warranted.

At step 816, the motion planner is informed via the interrupt that there is an obstacle (which may have been absent from prior point cloud frames), and where this obstacle might be on a collision course with the vehicle.

A third example of a threat detection process flow is for a shiny object 820, which can be another cross-cueing example (see 822). At step 824, an object is observed in a single camera frame, where the object has a color not present in recent pre-existing frames. This is deemed unlikely to have been obtained from the natural order, and hence is presumed to be a human artifact. Such a color change can be flagged in a color histogram for the point cloud. A tasked ladar shot can quickly determine the location of this object and determine if it is a small piece of debris or part of a moving, and potential threatening, object via a comparison to the vehicle's motion path. An interrupt can be issued if the color change object is deemed threatening (whereupon step 816 can be performed).

In the example of FIG. 8, it is expected that the compute complexity will be low—on the order of a few dozen operations per shot, which the inventors believe to be amenable to low latency solutions.

Figure 10A:
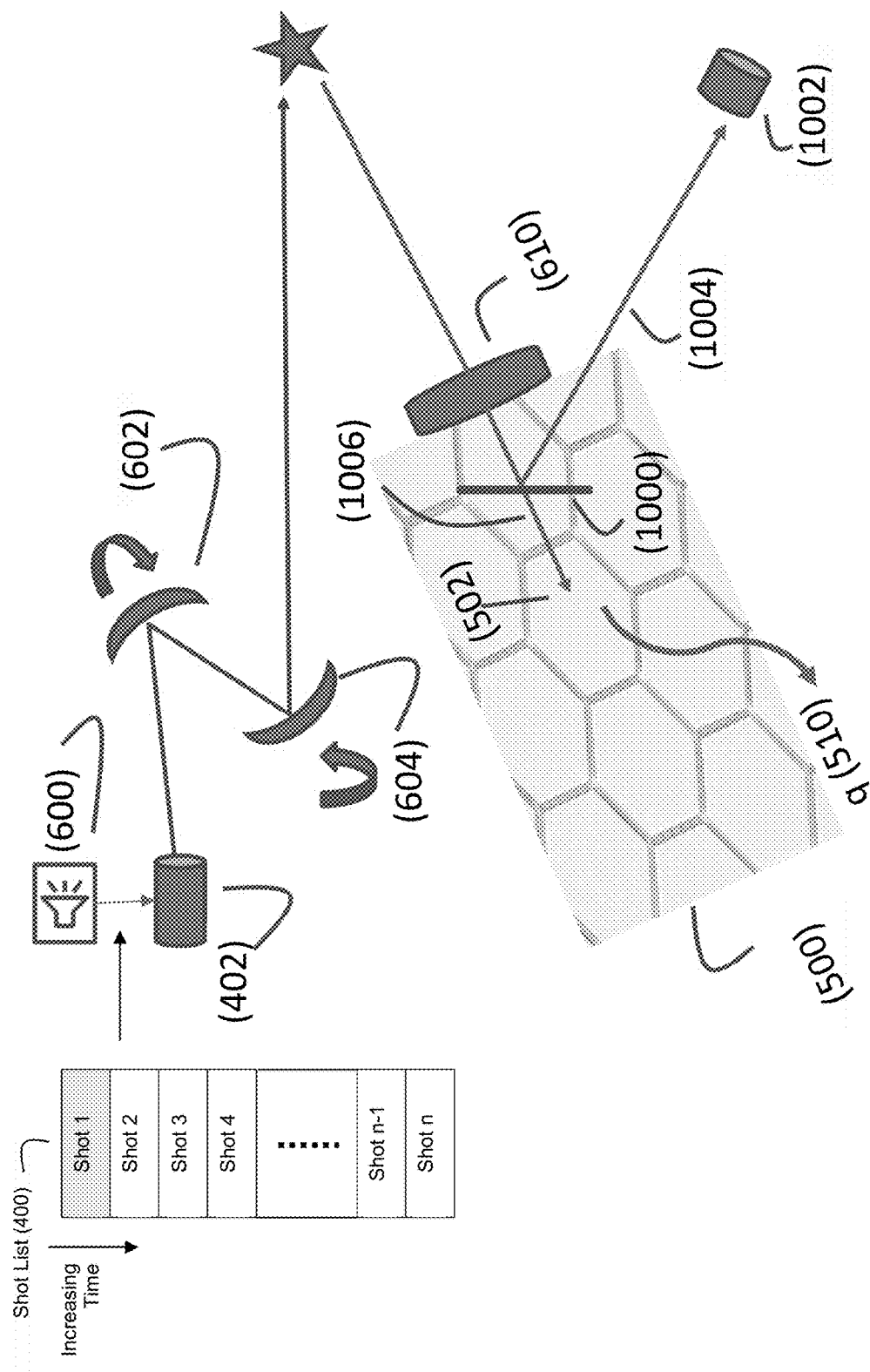
FIGS. 10A-10D show example embodiments where a co-bore sited a camera aids the ladar receiver to improve the latency by which ladar data is processed.
Figure 10B:
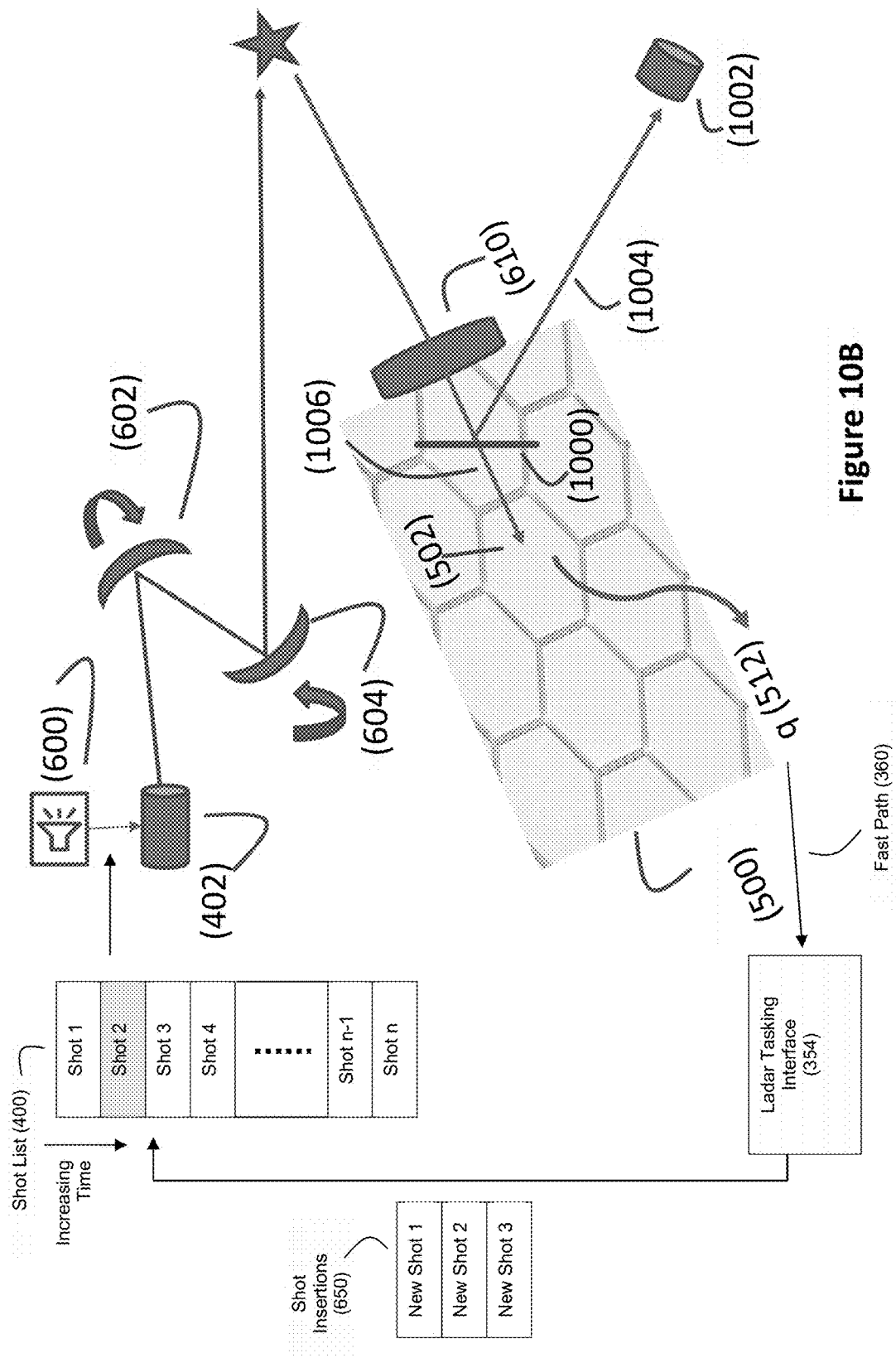
Figure 10C:
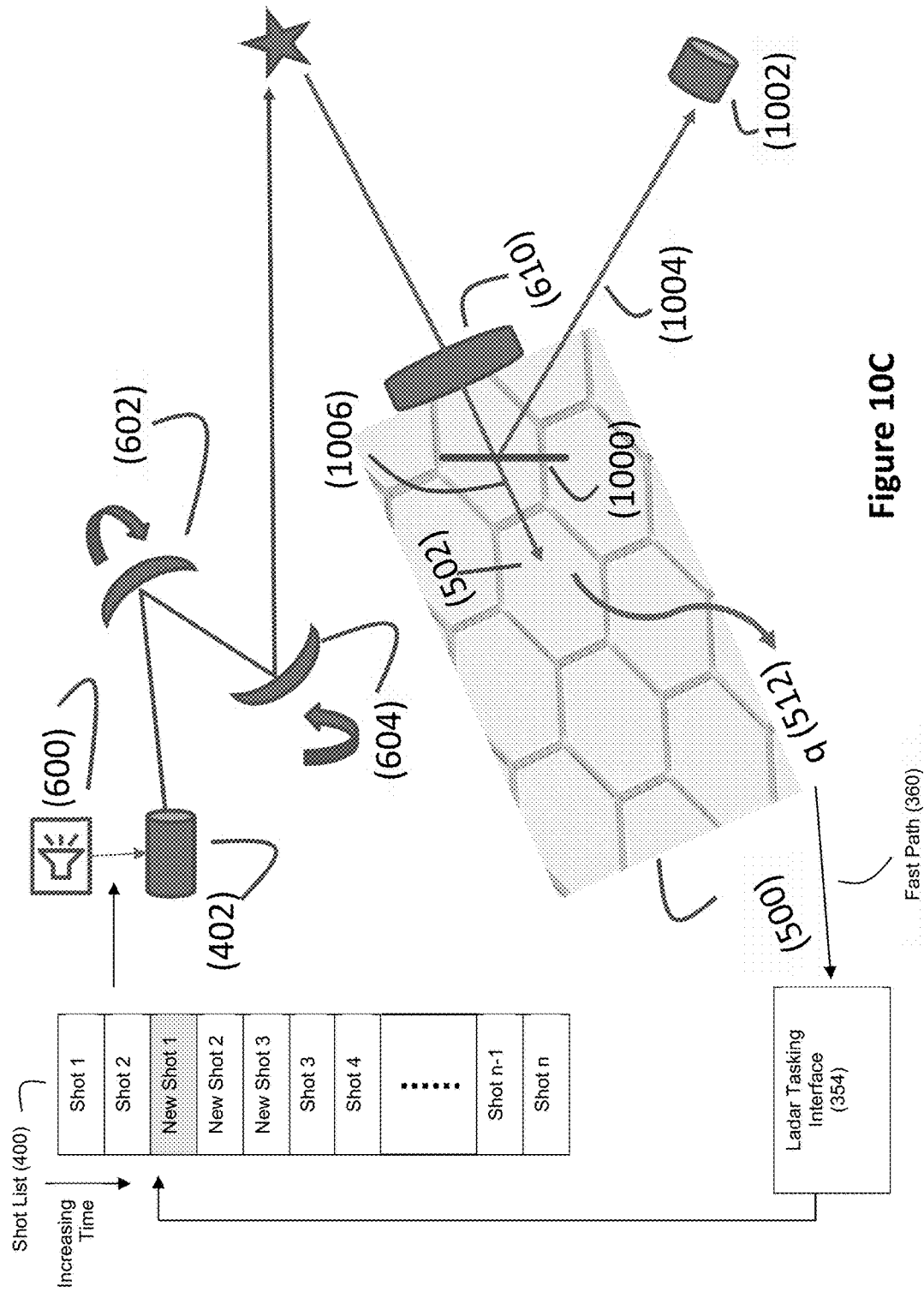

The examples of FIGS. 10A-10D show how co-bore siting a camera with the ladar receiver can improve the latency by which ladar data is processed. In conventional laser systems, a camera is positioned exterior to the laser system. This arrangement requires a computationally-intensive (and therefore latency-inducing) task in order to re-align the camera image with the laser. This re-alignment process for conventional laser systems with exterior cameras is known as parallax removal. To avoid such parallax removal tasks, FIGS. 10A-10D describe an example embodiment where a camera and ladar transceiver are part of a common optical engine. For example, FIGS. 10A-C show an example where a camera 1002 is co-bore sited with the photodetector 500 of a ladar receiver. Camera 1002 can be a video camera, although this need not be the case. The example of FIGS. 10A-C are similar to the example of FIGS. 6A-C with the exception of the co-bore sited camera 1002.

The lens 610 separates the receiver from the exterior environment and is configured to that it receives both visible and laser band light. To achieve co-bore siting, the optical system includes a mirror 1000 that is positioned optically between the lens 610 and photodetector 500 as well as optically between the lens 610 and camera 1002. The mirror 1000, photodetector 500 and camera 1002 can be commonly housed in the same enclosure or housing as part of an integrated ladar system. Mirror 1000 can be a dichroic mirror, so that its reflective properties vary based on the frequency or wavelength of the incident light. In an example embodiment, the dichroic mirror 1000 is configured to (1) direct incident light from the lens 610 in a first light spectrum (e.g., a visible light spectrum, an infrared (IR) light spectrum, etc.) to the camera 1002 via path 1004 and (2) direct incident light from the lens 610 in a second light spectrum (e.g., a laser light spectrum that would include ladar pulse reflections) to the photodetector 500 via path 1006. For example, the mirror 1000 can reflect light in the first light spectrum toward the camera 1002 (see path 1004) and pass light in the second light spectrum toward the photodetector 500 (see path 1006). Because the photodetector 500 and camera 1002 will share the same field of view due to the co-bore siting, this greatly streamlines the fusion of image data from the camera 1002 with range point data derived from the photodetector 500, particularly in stereoscopic systems. That is, the image data from the camera 1002 can be spatially aligned with computed range point data derived from the photodetector 500 without requiring the computationally-intensive parallax removal tasks that are needed by conventional systems in the art. For example, a typical high frame rate stereoscopic video stream requires 10s of Gigaflops of processing to align the video to the ladar data, notwithstanding losses in acuity from registration errors. These can be avoided using the co-bore sited camera 1002. Instead of employing Gigaflops of processing to align video and ladar, the use of the co-bore sited camera can allow for alignment using less complicated techniques. For example, to calibrate, at a factory assembly station, one can use a ladar system and a camera to capture an image of a checkboard pattern. Any inconsistencies between the camera image and the ladar image can then be observed, and these inconsistencies can then be removed by hardwiring an alignment of the readout code. It is expected that for commercial-grade ladar systems and cameras, these inconsistencies will be sparse. For example, suppose both camera and ladar system have an x-y pixel grid of 100×100 pixels. Then, both the ladar system and camera image against a 100×100 black and white checker board. In this example, the result may be that the pixels all line up except in upper right corner pixel 100,100 of the camera image is pointed off the grid, and pixel 99,100 of the camera image is at checkerboard edge, while the ladar image has both pixels 99,100 and 100,100 pointing at the corner. The alignment is then simply as follows:

1) Define the camera pixels in x and y respectively as i and j, with range being i,j=1, . . . , 100, and ladar as k and l, again with k,l=1, . . . , 100.
2) Index (fuse/align) the ladar based on pixel registrations with camera image. For example, suppose a camera pixel, say, 12,23 is inspected. Now suppose we want to likewise inspect its ladar counterpart. To do so, the system recalls (e.g., fetches from memory) pixel 12,23 in the ladar data. With respect to the example above, if the camera pixel is any pixel other than 99,100 or 100,100; then the recalled ladar pixel is the same as the camera pixel; and if we are accessing pixel 99,100 in the camera, we select an aggregation of pixels 99,100 and 100,100 in the ladar image; and if the camera image is at pixel 100,100, we access no ladar image.
3) Repeat in similar, though reversed, direction for ladar-cued camera.

Note that no complex operations are required to perform this alignment. Instead, a simple, small, logic table is all that is needed for each data query, typically a few kB. In contrast many Gbytes are required for non-bore sited alignment.

Figure 10D:
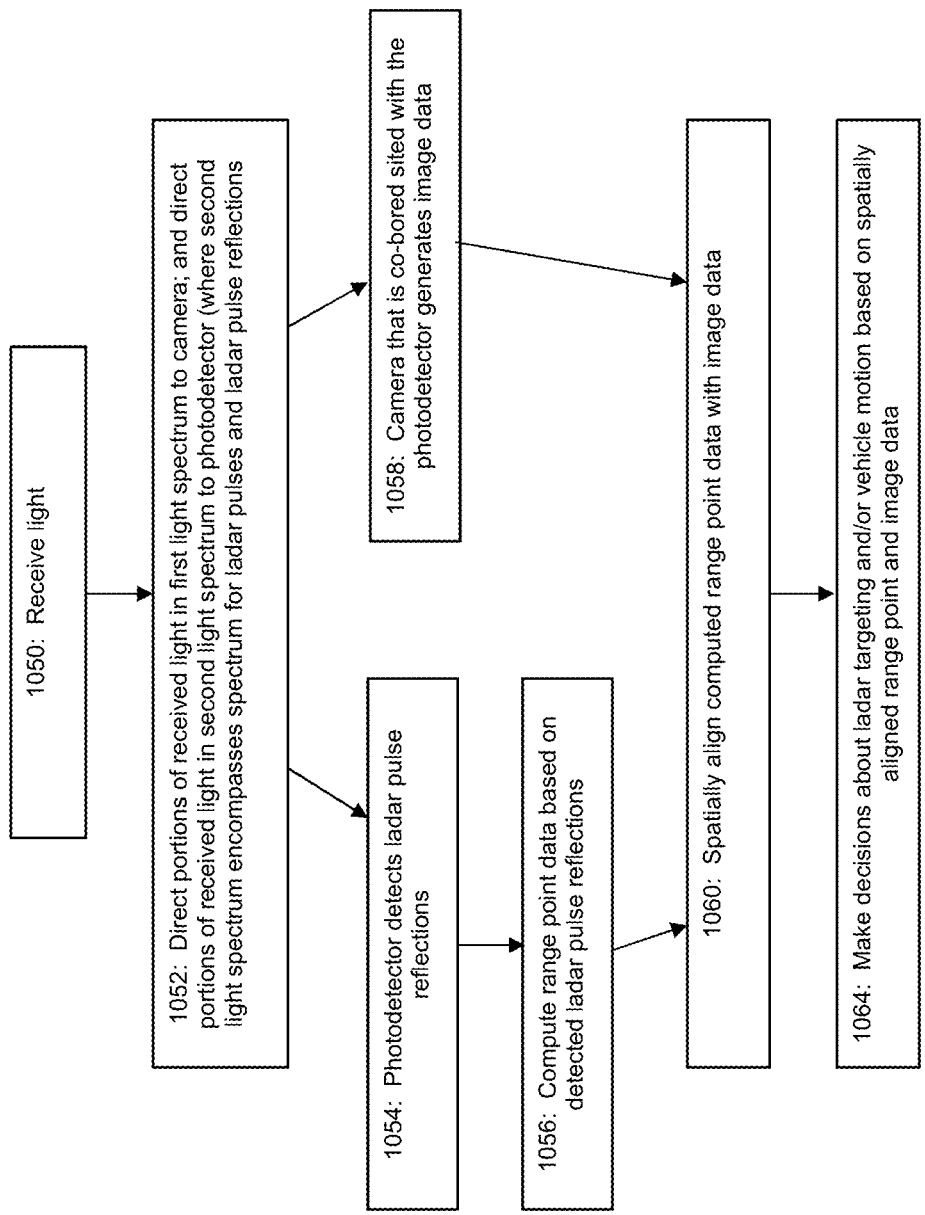

FIG. 10D depicts an example process flow showing how the co-bore sited camera 1002 can be advantageously used in a system. At step 1050, light is received. This received light may include one or more ladar pulse reflections as discussed above. Step 1050 can be performed by lens 610. At step 1052, portions of the received light in the first light spectrum are directed toward the camera 1002, and portions of the received light in the second light spectrum are directed toward the photodetector 500. As noted above, the second light spectrum encompasses the spectrum for ladar pulses and ladar pulse reflections. This step can be performed by mirror 1000.

At step 1054, the photodetector 1054 detects the ladar pulse reflections directed to it by the mirror 1000. At step 1056, range point data is computed based on the detected ladar pulse reflections. Step 1056 can be performed using a signal processing circuit and processor as discussed above.

Meanwhile, at step 1058, the camera 1002 generates image data based on the light directed to it by the mirror 1000. Thereafter, a processor can spatially align the computed range point data from step 1056 with the image data from step 1058 (see step 1060). Next, the ladar system and/or motion planning system can make decisions about ladar targeting and/or vehicle motion based on the spatially-aligned range point and image data. For example, as shown by FIGS. 10B-C, this decision-making can result in the insertion of new shots in shot list 400. Further still, the motion planning system 202 can choose to alter vehicle motion in some fashion based on the content of the spatially-aligned range point and image data.

It should be understood that FIGS. 10A-10C show example embodiments, and a practitioner may choose to include more optical elements in the system. For example, additional optical elements may be included in the optical paths after splitting by mirror 1000, such as in the optical path 1004 between the mirror 1000 and camera 1002 and/or in the optical path 1006 between the mirror 1000 and photodetector 500. Furthermore, the wavelength for camera 1002 can be a visible color spectrum, a grey scale spectrum, a passive IR spectrum, hyperspectral spectrum, and with or without zoom magnification. Also, the focal plane of the ladar system might have sufficient acceptance wavelength to serve as a combined active (ladar) and passive (video) focal plane.

Another advantage of latency reduction is the ability to compute motion data about an object based on data within a single frame of ladar data. For example, true estimates of (3D) velocity and acceleration can be computed from the ladar data within a single frame of ladar shots. This is due to the short pulse duration associated with fiber or diode ladar systems, which allows for multiple target measurements within a short timeline. Velocity estimation allows for the removal of motionless objects (which will have closing velocity if a ladar-equipped vehicle is in motion). Velocity estimation also allows for a reduction in the amount of noise that is present when a track is initiated after detection has occurred. For example, without velocity, at 100 m and a 10 mrad beam, one might require a range association window of 3 m, which for a 3 ns pulse corresponds to 18 x,y resolution bins of noise exposure (½ m from pulse width, and 1 m from beam divergence). In contrast, if there is a velocity filter of 3 m/s in both dimensions in addition to the 3 m association, then, at a nominal 10 Hz frame rate, the extent of noise exposure reduces to around 2-4 bins. The ability to compute motion data about an object on an intraframe basis allows for robust kinematic models of the objects to be created at low latency.

Figure 11A:
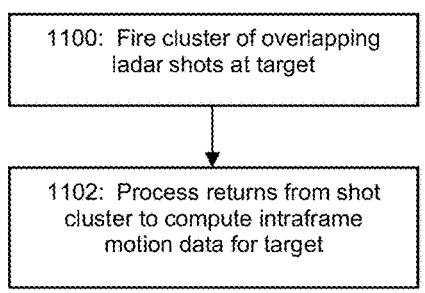
FIGS. 11A and 11B show example process flows where tight clusters of ladar shots are used to facilitate computations of intraframe motion data for a target.

FIG. 11A shows an example process flow for computing intra-frame motion data in accordance with an example embodiment. At step 1100, the ladar transmitter 302 fires a cluster of overlapping ladar pulse shots at a target within a single ladar frame. The ladar pulses in the cluster are spaced apart in time over a short duration (e.g., around 5 microseconds to around 80 microseconds for typical MEMS resonance speeds in embodiments where MEMS scanning mirrors are employed by the ladar system). The beam cluster can provide overlap in all three dimensions—azimuth, elevation, and range. This can be visualized by noting that each ladar pulse carves out, over the flight time of the pulse, a cone of light. At any point in time, one can calculate from the mirror positions where this cone will be positioned in space. This information can be used to select pulse shot times in the scheduler to ensure overlap in all three dimensions. This overlap provides a unique source of information about the scene by effectively using different look angles (parallax) to extract information about the scene.

The latency advantage of this clustering approach to motion estimation can be magnified when used in combination with a dynamic ladar system that employs compressive sensing as described in the above-referenced and incorporated patents and patent applications. With such a dynamic ladar system, the ladar controller exerts influence on the ladar transmissions at a per pulse (i.e. per shot) basis. By contrast, conventional ladar systems define a fixed frame that starts and stops when the shot pattern repeats. That is, the shot pattern within a frame is fixed at the start of the frame and is not dynamically adapted within the frame. With a dynamic ladar system that employs compressive sensing, the shot pattern can dynamically vary within a frame (.e., intraframe dynamism)—that is, the shot pattern for the i-th shot can depend on immediate results of shot i−1.

Typical fixed frame ladar systems have frames that are defined by the FOV; the FOV is scanned shot to shot; and when the FOV has been fully interrogated, the process repeats. Accordingly, while the ability of a dynamic ladar system that employs compressive sensing to adapt its shot selection is measured in microseconds; the ability of conventional fixed frame ladar systems to adapt its shot selection is measured in hundreds of milliseconds; or 100,000× slower. Thus, the ability the of use dynamically-selected tight clusters of intraframe ladar pulses to help estimate motion data is expected to yield significantly improvements in latency with respect to object motion estimation.

Returning to FIG. 11A, meanwhile, at step 1102, the ladar receiver 304 receives and processes the reflection returns from the cluster of ladar pulses. As part of this processing, the ladar receiver 304 can compute intraframe motion data for the target. This motion data can be computed based on changes in range and intensity with respect to the reflection returns from the range points targeted by the tight cluster. For example, velocity and acceleration for the target can be estimated based on these reflection returns. By computing such motion data on an intra-frame basis, significant reductions in latency can be achieved with respect to modeling the motion of one or more targets in the field of view, which in turn translates to faster decision-making by a motion planning system.

Figure 11B:
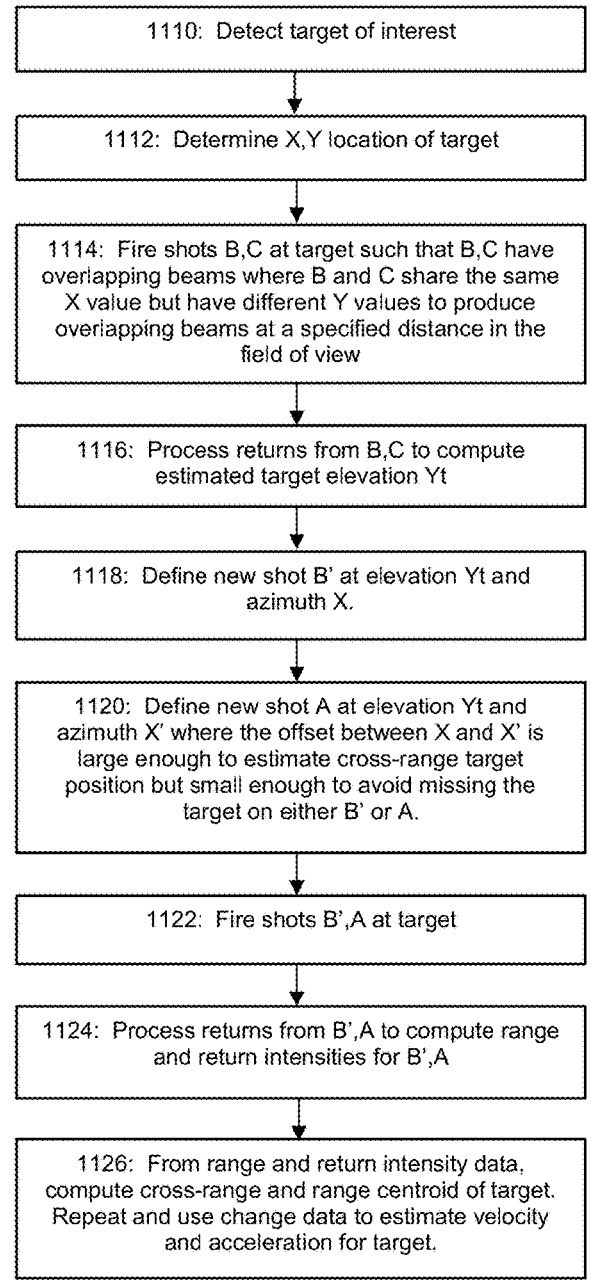

FIG. 11B shows an example process flow for implementing steps 1100 and 1102 from FIG. 11A. FIG. 12A shows an example cluster of ladar pulse beams for reference with respect to FIG. 11B. FIG. 11B begins with step 1110, where a target of interest is detected. Any of a number of techniques can be used to perform target detection. For example, ladar data and/or video data can be processed at step 1110 to detect a target. Further still, software-defined frames (examples of which are discussed below) can be processed to detect a target of interest. As an example, a random frame can be selected at step 1110, the target can be declared as the returns whose range does not map to fixed points from a high resolution map. However, it should be understood that other techniques for target detection can be employed.

At step 1112, the coordinates of the detected target can be defined with respect to two axes that are orthogonal to each other. For ease of reference, these coordinates can be referred to as X and Y. In an example embodiment, X can refer to a coordinate along a horizontal (azimuth) axis, and Y can refer to a coordinate along a vertical (elevation) axis.

At step 1114, the ladar transmitter 302 fires ladar shots B and C at the target, where ladar shots B and C share the same horizontal coordinate X but have different vertical coordinates such that ladar shots B and C have overlapping beams at the specified distance in the field of view. FIG. 12A shows an example of possible placements for ladar shots B and C. It should be understood that the radii of the beams will be dependent on both optics (divergence) and range to target.

At step 1116, the ladar receiver 304 receives and processes returns from ladar shots B and C. These reflection returns are processed to compute an estimated target elevation, Yt. To do so, the shot energy of the returns from B and C can be compared. For example, if the energy for the two returns is equal, the target can be deemed to exist at the midpoint of the line between the centers of B and C. If the energy in the B return exceeds the energy in the C return, then the target can be deemed to exist above this midpoint by an amount corresponding to the energy ratio of the B and C returns (e.g., proportionally closer to the B center for corresponding greater energy in the B return relative to the C return). If the energy in the C return exceeds the energy in the B return, then the target can be deemed to exist below this midpoint by an amount corresponding to the energy ratio of the B and C returns (e.g., proportionally closer to the C center for corresponding greater energy in the C return relative to the B return).

At step 1118, a new ladar shot B' is defined to target a range point at vertical coordinate Yt and horizontal coordinate X. Next, at step 1120, a new ladar shot A is defined to target a range point at vertical coordinate Yt and at a horizontal coordinate X', where the offset between X and X' is large enough to allow estimation of cross-range target position but small enough to avoid missing the target with either B' or A. That is, at least one of B' and A will hit the detected target. The choice of X' will depend on the distance to, and dimensions of, objects that are being characterized as well as the ladar beam divergence, using mathematics. For example, with a 10 mrad beam, 100 m range, and a 1 m width vehicle (e.g., motorbike), when viewed from the rear, the value for X' can be defined to be ½ meter.

At step 1122, the ladar transmitter 302 fires ladar shots B' and A at their respective targeted range points. The ladar receiver 304 then receives and processes the reflection returns for B' and A to compute range and intensity data for B' and A (step 1124). Specifically, the desired reflection values can be obtained by taking the standard ladar range equation, inputting fixed ladar system parameters, and calculating what the target reflectivity must have been to achieve the measured signal pulse energy. The range can be evaluated using time of flight techniques. The ranges can be denoted by Range(B') and Range(A). The intensities can be denoted by Intensity(B') and Intensity(A). Then, at step 1126, a processor computes the cross-range and range centroid of the target based on Range(B'), Range(A), Intensity (B'), and Intensity(A). The cross-range can be found by computing the range (time of flight), denoted by r, azimuth angle θ (from shot fire time and mirror position), and evaluating the polar conversion r sin(θ). With I(i) denoting intensity and with multiple measurements the range centroid is found as:

$$\sum_i \frac{I(i)r(i)}{\sum_k I(k)}$$

while the cross range centroid is $$\sum_i \frac{I(i)r(i)\sin(\theta_i)}{\sum_k I(k)}$$

As new data is collected after a period time long enough to allow the object of interest to move by at least a few millimeters, or centimeters, this process can be repeated from scratch, and the changes in position for the centroid can be used to estimate velocity and acceleration for the target.

FIG. 12A shows an example beam layout in a field of view for a ladar shot cluster that helps illustrate the principle of operation with respect to FIG. 11B. Shown by FIG. 12A are beam positions A, B, C (1200) where a target is interrogated. These beams are overlapping at the full width half maximum, or $1/e^2$ level. For the purpose of discussion and the sake of pedagogic demonstration, it will be assumed that (i) the valid target lies within the union of these beams A, B, and C, and (ii) A, B and B, C are coplanar. In this context, three beams are defined to be coplanar if there exists a pairwise paring whose joint collinear look directions are orthogonal. In FIG. 12A, it can be seen that this is the case because A,B align horizontally and B,C align vertically. Note that we do not require that the central axis (phase centers) be coincident. The true target lies at 1201 within the field of view. As noted, the process flow of FIG. 11B can allow an interpolation in azimuth and elevation to obtain a refined estimate of target location at a point in time. A ladar beam centered on (or near) this refined estimate can be denoted as A' (1202). In practice, A' will rarely if ever be perfectly centered on 1201, because (i) we are only approximating the true value of 1201 with our centroid due to noise, and (ii) the software will generally, if not always, be limited to a quantized set of selectable positions. Once beam A' is created, the system can also create collinear overlapping ladar beams B' and C' as well (not shown in FIG. 12A for ease of illustration). The result of interrogations and analysis via these beams will be the velocity table shown by FIG. 12B. From this, the system can produce refined estimates of range and angular position for the target, but for purposes of discussion it suffices to consider knowledge as a substantially reduced fraction of beam divergence (angle position), the range case follows similarly. This accuracy allows for a look at pairwise changes in angle and range to extract velocity and acceleration information for the target. Accordingly, the process flow of FIG. 11B can be used to track lateral motion for targets.

FIG. 12B shows example timelines for target tracking in accordance with the example process flow of FIG. 11B, and these timelines show the clustering technique for computing intraframe motion data to be superior to conventional approaches as discussed below. Moreover, the timelines are short enough to not hinder the speed of the scan mirrors, which can be helpful for maintaining a large field of view while also achieved low motion planning latency.

To provide a sample realistic scenario, and velocity extraction comparison with existing coherent FMCW (Frequency Modulation Continuous Wave) lasers, we assume a 3 ns pulse, a 100 m target, 25 meter/second closing target speed, and 10% non-radial speed for the overall velocity vector. We also assume commensurate ratios for acceleration, with $1/ms^2$ acceleration (roughly 10% of standard gravity g-force). We assume an ability to measure down to 20% of the uncertainty in beam and range bin, as defined at the full width half maximum (FWHM) level. We use a 15 KHz fast scan axis assumption, which in turn leads to nominal 30 μsec revisit rate. As a basis of comparison, we can consider the FMCW laser disclosed in U.S. Pat. Nos. 9,735,885 and 9,310,471, which describe a ladar system based on Doppler extraction and has a dwell time of no less than 500 nanoseconds. This has a disadvantage in that the beam will slew a lot during that time, which can be overcome with photonic steering; but the need for high duty cycle and time integration for Doppler excision limit the achievable pulse narrowness. The current comparison for FIG. 12B is based on the ability to extract non-radial velocity.

In FIG. 12B, we see that the time between shots for position accuracy refinement is between 30 μsec and 2,000 μsec (shown as 2 ms in FIG. 12B). The upper limit is the time before the range has drifted such that we are conflating range with range bin. To estimate range rate, we wait until the target has moved by an amount that can be reliably estimated. That would be about 3 mm (for a 10 cm duration [~3.3 ns], SNR~60). So, at 25 m/s, we can detect motion in increments of 20% for motion of 5 m/s, which with a 1 ms update translates to 5 mm. We conclude that 1 m/s is a good lower bound on the range rate update as reflected in FIG. 12B. For angular target slew, the acceleration is not discernable, and therefore velocity is not blurred, for motion of 1 m/s/s/5, or 20 cm/s/s. For 10% offset this becomes 2 cm/s. At 100 m with 3 mrad offset, we obtain ~30 cm cross-range extent, or 300 mm, becoming, after 5:1 split, 60 k μm. Hence, in 1 ms of time, acceleration motion, with 5:1 splitting is 20 μm. To become 5:1 of our angular beam, we then grow this by 3,000. We conclude that the limiting factor for dwell in angle space is velocity beam walk not acceleration. Here, we see that we walk $\frac{1}{5}^{th}$ of a beam with 6 cm, so at our specified 10% of 25 m/s crab, we get 2.5 m/s, or 2.5 mm/ms. We get blurring then around about 10 ms. We provide a margin between upper range bounds and lower range rate bounds of a nominal 50%. We do not include acceleration in FIG. 12B, because reliable position gradient invariably involves terrain and kinematic constraints making more complex radiometric and ego motion modeling necessary. Software tools are available from Mathworks, MathCAD, Ansys, and others can assist in this endeavor.

Acceleration typically blurs velocity by 5 mm/s in 5 ms. To detect 5 m/s, our specification from the above paragraph, we would have 10× margin with this rate of blur. Since error accumulates with each successive differential operator, it is prudent to take such margin, and hence we use 5 ms as the maximum duration between samples for true velocity. Side information can expand this substantially, by nowhere near the 10-20 Hz common for spinning systems.

In FIG. 12B, angular beam positions at time of launch (shot list) are denoted by capital letters, and time of pulse launch in lower case. We show examples of data pairings used to obtain range and range rate in all three (polar) coordinates. Mapping to standard Euclidean unit vectors is then straight forward.

While the ability to obtain with a single frame (intraframe) improved ranging, velocity, and acceleration, leads to improved ladar metrics such as effective SNR and mensuration, it should be understood that there are additional benefits which accrue when this capability is combined with intraframe communications such as communications with image data derived from a camera or the like, as discussed below.

Once communication between the ladar system and a camera is established inter-frame, still more latency reduction can be achieved. To facilitate additional latency reduction, an example embodiment employs software-defined frames (SDFs). An SDF is a shot list for a ladar frame that identifies a set, or family, of pre-specified laser shot patterns that can be selected on a frame-by-frame basis for the ladar system. The selection process can be aided by data about the field of view, such as a perception stack accessible to the motion planning system and/or ladar system, or by the end user. Processing intelligence in the ladar system can aid in the selection of SDFs or the selection can be based on machine learning, frame data from a camera, or even from map data.

For example, if an incoming vehicle is in the midst of passing a car in front of it, and thereby heading at speed towards a (potential) head on collision, the SDF stack can select an area of interest around the ingressing threat vehicle for closer monitoring. Extending on this, multiple areas of interest can be established around various vehicles, or fixed objects for precision localization using motion structure. These areas of interest for interrogation via ladar pulses can be defined by the SDFs; and as examples the SDFs can be a fixed grid, a random grid, or a "foviated" grid, with a dense shot pattern around a desired "fixation point" and more sparsely sampled elsewhere. In cases where a potential collision is predicted, the ladar frame can be terminated and reset. There can be a great benefit to leverage ladar/camera vision software that emulates existing fixed ladar systems, such as spinning lidars. Accordingly, there is value to the practitioner in including, in the SDF suite, emulation modes for fixed ladar scanners in order to leverage such software. For example, a foviated SDF can be configured whereby the road segment that the ladar-equipped vehicle is entering enjoys a higher shot density, possibly with highest density at the detection horizon and/or geographic horizon, whereby the sky, and other non-road segments are more sparsely populated with shots.

Figure 13A:
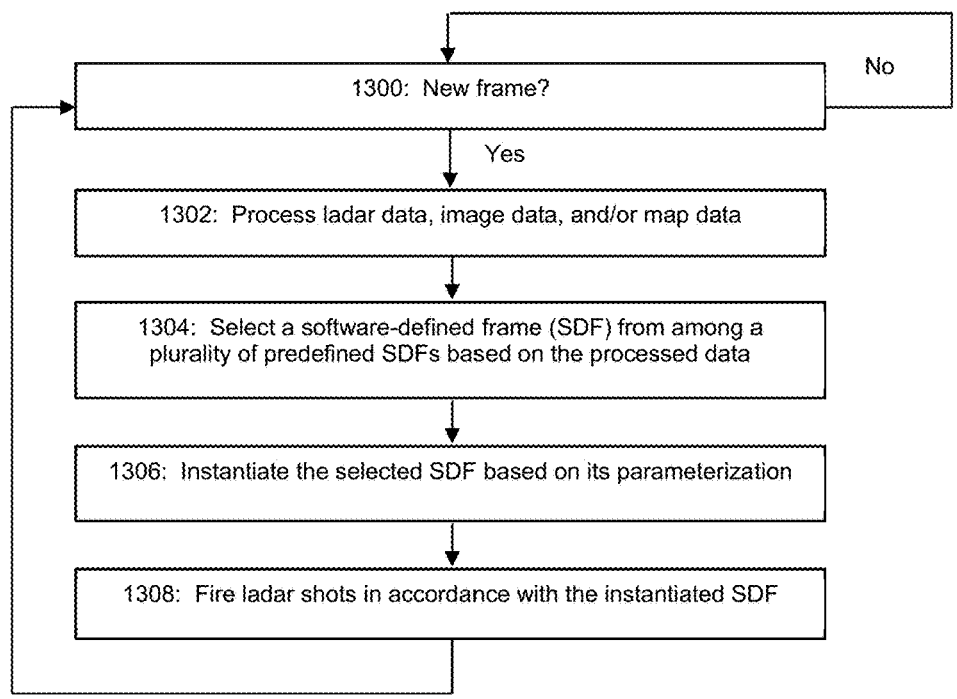
FIG. 13A shows an example process flow for frame-by-frame selection of shot list frames for a ladar system.

FIG. 13A discloses an example process flow for execution by a processor to select SDFs for ladar system on the basis of observed characteristics in the field of view for the ladar system. This permits low latency adaptation of ladar shots on a frame-by-frame basis.

At step 1300, the processor checks whether a new ladar frame is to be started. If so, the process flow proceeds to step 1302. At step 1302, the processor processes data that is representative of one or more characteristics of the field of view for the ladar system. This processed data can include one or more of ladar data (e.g., range information from prior ladar shots), image data (e.g., images from a video camera or the like), and/or map data (e.g., data about known objects in or near a road according to existing map information). Based on this processed data, the processor can make judgments about the field of view and select an appropriate SDF from among a library of SDFs that is appropriate for the observed characteristics of the field of view (step 1304). The library of SDFs can be stored in memory accessible to the processor, and each SDF can include one or more parameters that allow for the specific ladar shots of that SDF to be further tailored to best fit the observed situation. For example, these parameters can include one or more variables that control at least one of spacing between ladar pulses of the SDF, patterns defined by the ladar pulses of the SDF (e.g, where the horizon or other feature of a foviated SDF is located, as discussed below), and specific coordinates for targeting by ladar pulses of the SDF. At step 1306, the processor instantiates the selected SDF based on its parameterization. This results in the SDF specifically identifying a plurality of range points for targeting with ladar pulses in a given ladar frame. At step 1308, the ladar transmitter then fires ladar pulses in accordance with the instantiated SDF. Upon completion of the SDF (or possibly in response to an interrupt of the subject ladar frame), the process flow returns to step 1300 for the next frame.

FIGS. 13B-13I show examples of different types of SDFs that can employed by the ladar system as part of the example embodiment of FIG. 13A, where the various lines and other patterns in the examples of FIGS. 13B-13I show where ladar pulses are to be targeted in the field of view.

Figure 13B:
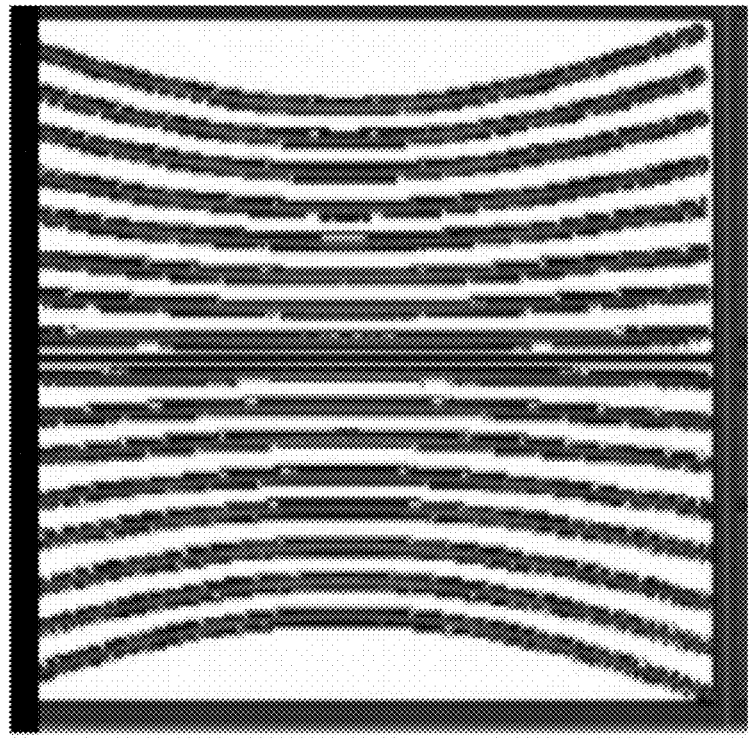
FIGS. 13B-13I show examples of different types of shot list frames that can be supported by the process flow of FIG. 13A.

FIG. 13B shows an example raster emulation SDF. The raster pattern defined by this SDF corresponds to the standard scan pattern used by many ladar systems. To maintain agility, it is desirable for the ladar system to emulate any existing ladar system, which allows the ladar system to leverage existing ladar exploitation software.

Figure 13C:
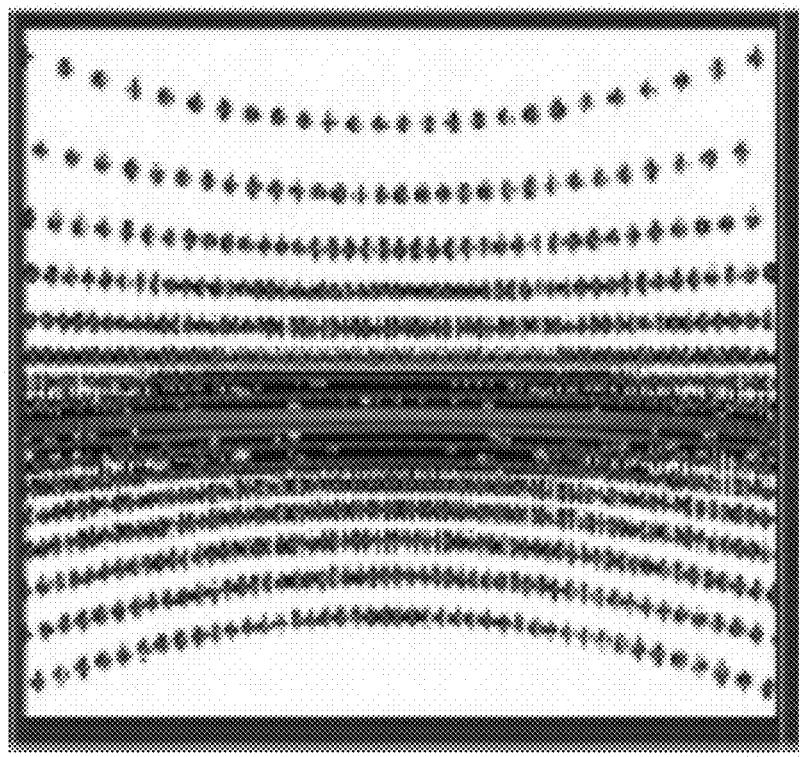
Figure 13D:
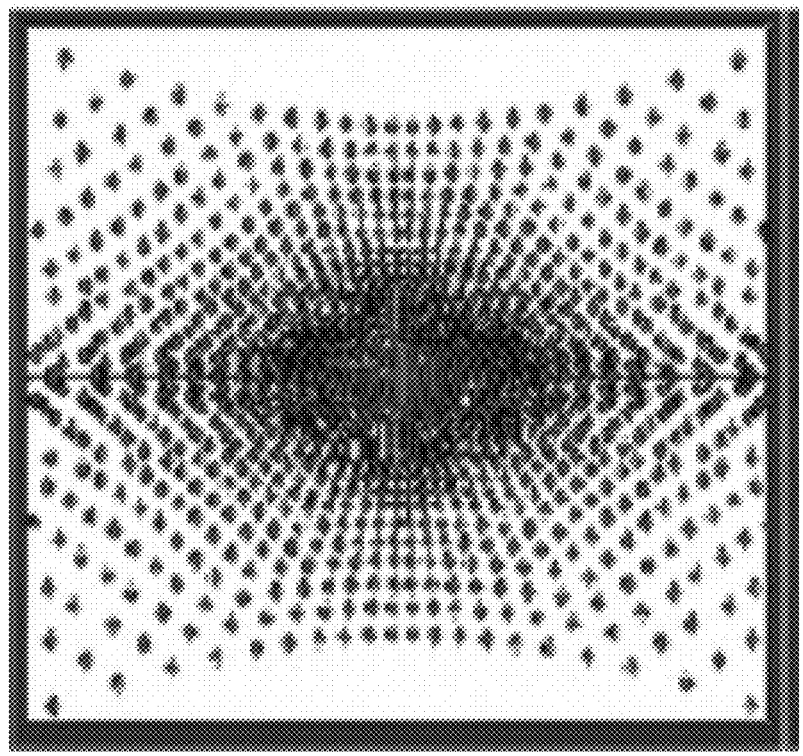

FIGS. 13C-13D show examples of foviation SDFs. With a foviation SDF, the ladar shots are clustered in areas that are deemed a potential threat area or other region of interest to allow for fast threat response. An example of a potential threat area in a field of view would be the lane traveled by the ladar-equipped vehicle. The foviation can vary based on a number of patterns. For example, FIG. 13C shows an elevation (or vertical) foviation SDF. Note that foviation is defined as the axis where sparsification (lower and higher density) is desired. This is opposite the axis of symmetry, i.e. the axis where shots are (uniformly) densely applied. In the example of FIG. 13C, the foviation focuses on a particular elevation in the field of view, but scans all the horizon. A desirable elevation choice is the intersection of the earth horizon and the lane in which the ladar-equipped vehicle is traveling. We might also want to scan the lane horizontally, and beyond, to see if there is an upcoming intersection with vehicle ingress or egress. In elevation, the shot density is highest at this horizon area and lower at immediately higher or lower elevations or perhaps lower at all other elevations, depending on the degree of sparsification desired. Another potential foviation pattern is an azimuth (or horizontal) foviation SDF, in which case the higher density of shots would correspond to a vertical line at some define position along the horizontal axis (azimuth is sparse and symmetry is vertical). Another example is a centroidal foviation SDF, an example of which is shown by FIG. 13D. In the example of FIG. 13D, the foviation is focused along a specified vertical and horizontal coordinate which leads to a centroidal high density of ladar shots at this elevation/azimuth intersection. Parameterization of the foviation SDFs can define the locations for these high densities of ladar shots (as well as the density of such shots within the SDF).

Figure 13E:
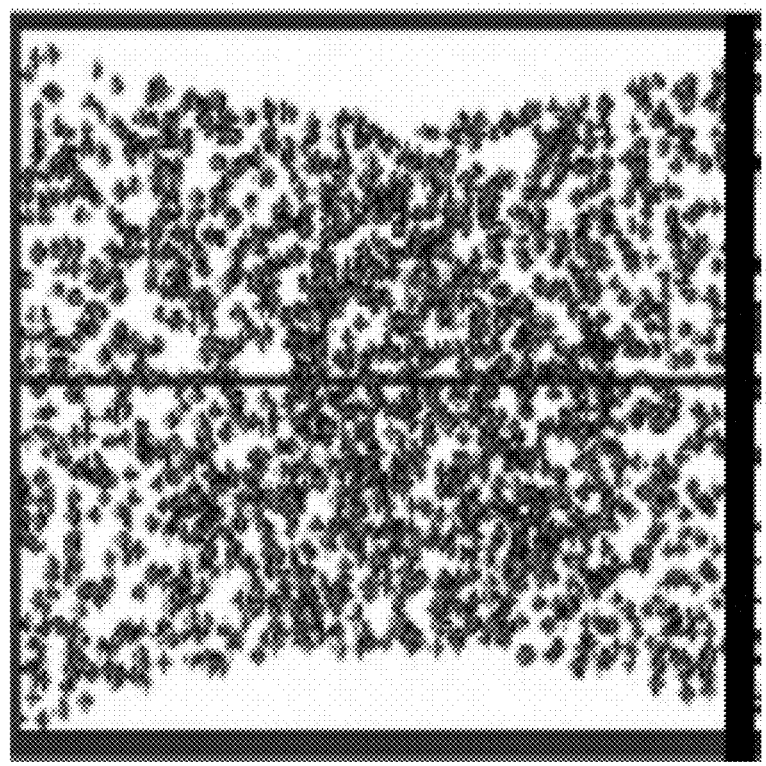

FIG. 13E shows an example of a random SDF, where the ladar shots are spread throughout the field of view based on a random sampling of locations. The random SDF can help support fast threat detection by enabling ambiguity suppression. A random SDF can be parameterized to control the degree of randomness and the spacing of random shots within the field of view. For example, the random list of ladar shots in the random SDF can be controllably defined so that no potential target can move more than 10 feet before being detected by the ladar system.

Figure 13F:

FIG. 13F shows an example of a region of interest SDF. As an example, a region of interest SDF can define regions of interest for targeting with ladar shots within a given ladar frame. Examples shown by FIG. 13F include fixed regions such as tripwires where vehicles might ingress or egress (see the thin lines at road crossings in FIG. 13F)) and/or bounding boxes (see the rectangular box behind the car in the left hand lane of FIG. 13F). This example shows a region of interest which is perhaps in front of the ladar system, an area of keen interest. The bounding boxes can be obtained from prior ladar scans and/or machine vision (e.g., via processing of camera image data), and the bounding boxes enable the system to retain custody of previously detected targets. Examples of such targets can include pedestrian(s) detected via machine vision, motorcycle(s) detected via machine vision, and street sign(s) (or other fixed fiducials) detected via machine vision.

Figure 13G:
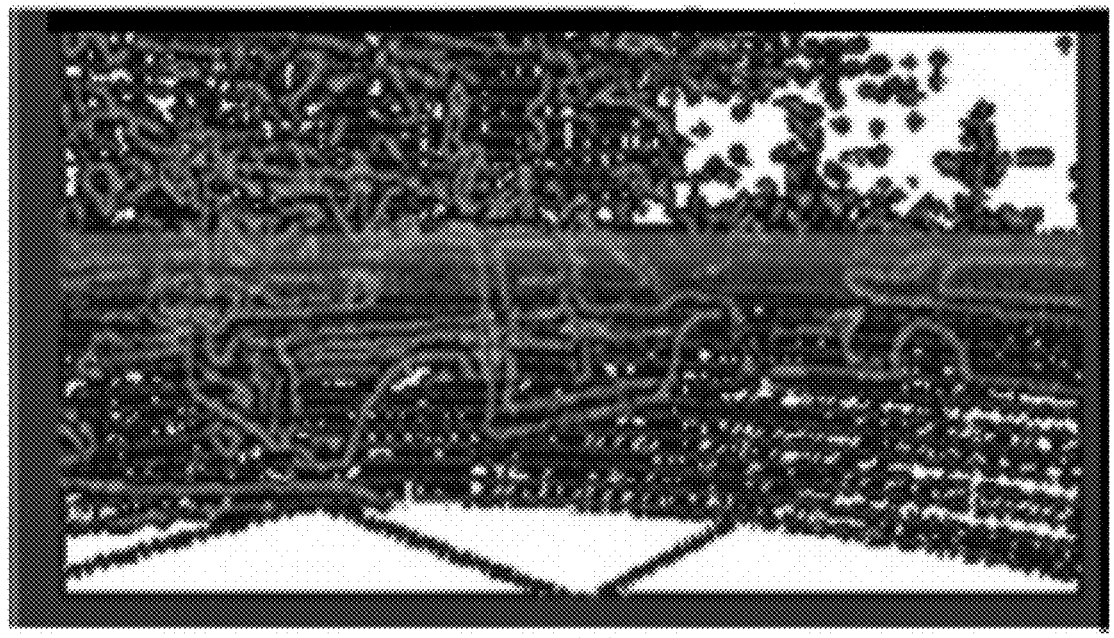

FIG. 13G shows an example image-cued SDF. The image that cues such an SDF can be a passive camera image or an image rendered from ladar data. As an example, the image-cued SDF can be based on edges that are observed in the images, where detected edges can be used to form a frame for subsequent query by the ladar system. As another example, the image-cued SDF can be based on shadows that are observed in the images, where detected shadows can be used to form a frame for subsequent query by the ladar system. Another example would be cueing of the ladar from bounding boxes to enhance the depth sensing of video-only systems. For example, dedicated range point selection as disclosed herein can leverage the technology described in "Estimating Depth from RGB and Sparse Sensing", by Magic Leap, published in Arxiv, 2018 toward this end.

Figure 13H:
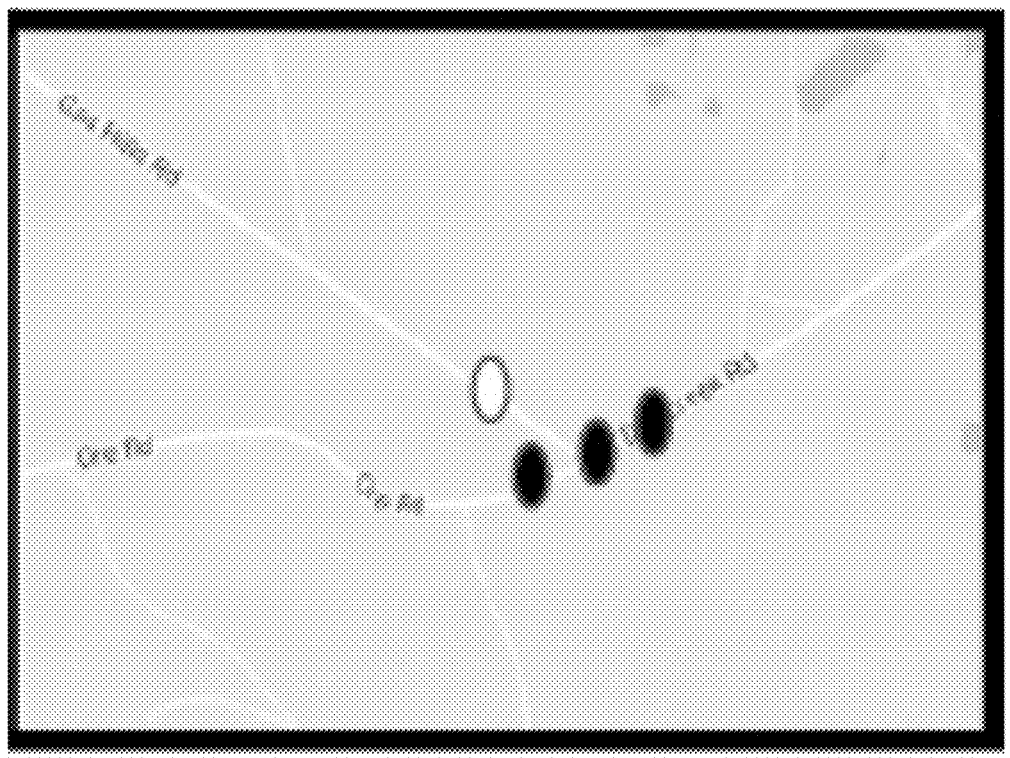

FIG. 13H shows an example map-cued SDF. A map-cued SDF can be a powerful mode of operation for an agile ladar system because the frames are based on own-car sensing but on previously-collected map data. For example, the map data can be used to detect a cross road, and a map-cued SDF can operate to query the cross-road with ladar shots prior to arrival at the cross road. The cross road locations are shown in FIG. 13H as block dots while the white dot corresponds to a ladar-equipped vehicle entering an intersection.

Using single frame cueing assists both the ladar data and the camera data. The camera can direct frame selection from the SDF suite. Also, the ladar data can be used to enhance video machine learning, by establishing higher confidence when two objects are ambiguously associated (resulting in an undesired, high, confusion matrix score). This example shows how existing software can be readily adapted and enhanced through intraframe (i.e. subframe) video/ladar fusion. For example, a standard spinning ladar system might have a frame rate of 10 Hz. Many cameras allow frame rates around 100 Hz, while conventional ladar frames rates are generally around 10 Hz—or 10 times less than the camera frame rates. Thus, by waiting for a ladar frame to be complete before fusing camera data, it can be seen that there is latency involved while the system waits for completion of the ladar frame. Accordingly, it should be understood that such sub frame processing speeds up latency, and enables updating SDFs on a frame-to-frame basis without setup time or interframe latency.

Figure 13I:
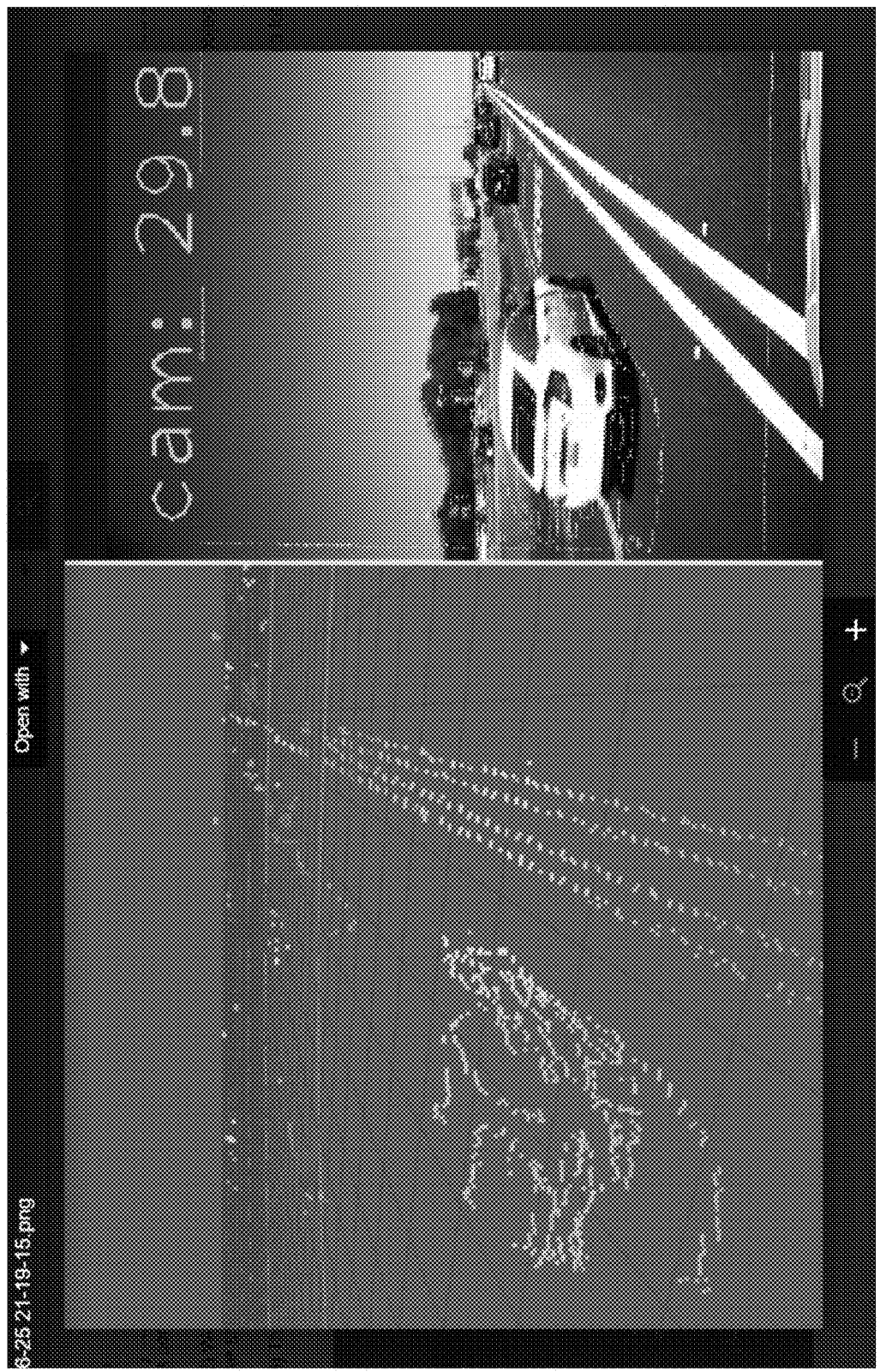

A particularly compelling use case of camera-ladar cross-cueing is shown in FIG. 13I. The left hand side of FIG. 13I shows a ladar map of a field of view, and the right hand side of FIG. 13I shows a camera image of the field of view overlaid with this ladar map (where this example was produced using the AEYE JO-G ladar unit. It can be seen from the right hand side of FIG. 13I that the vehicles have moved from when the ladar map was formed, and this can be detected by inspecting the visual edges in the color camera image and comparing to the edges in the ladar image. This type of cross-cueing is very fast, and far less error prone than attempting to connect edges from frame-to-frame alone in either camera or ladar images. The time required to determine vehicle direction and speed, after the ladar frame is finished is simply the time to take one camera image (10 msec or so), followed by edge detection in the camera image (which can be performed using freely available Open CV software), which takes time on the order of 100K operations, which is a significant improvement compared to the Giga-operations that would be expected for optical camera images only.

Figure 14:
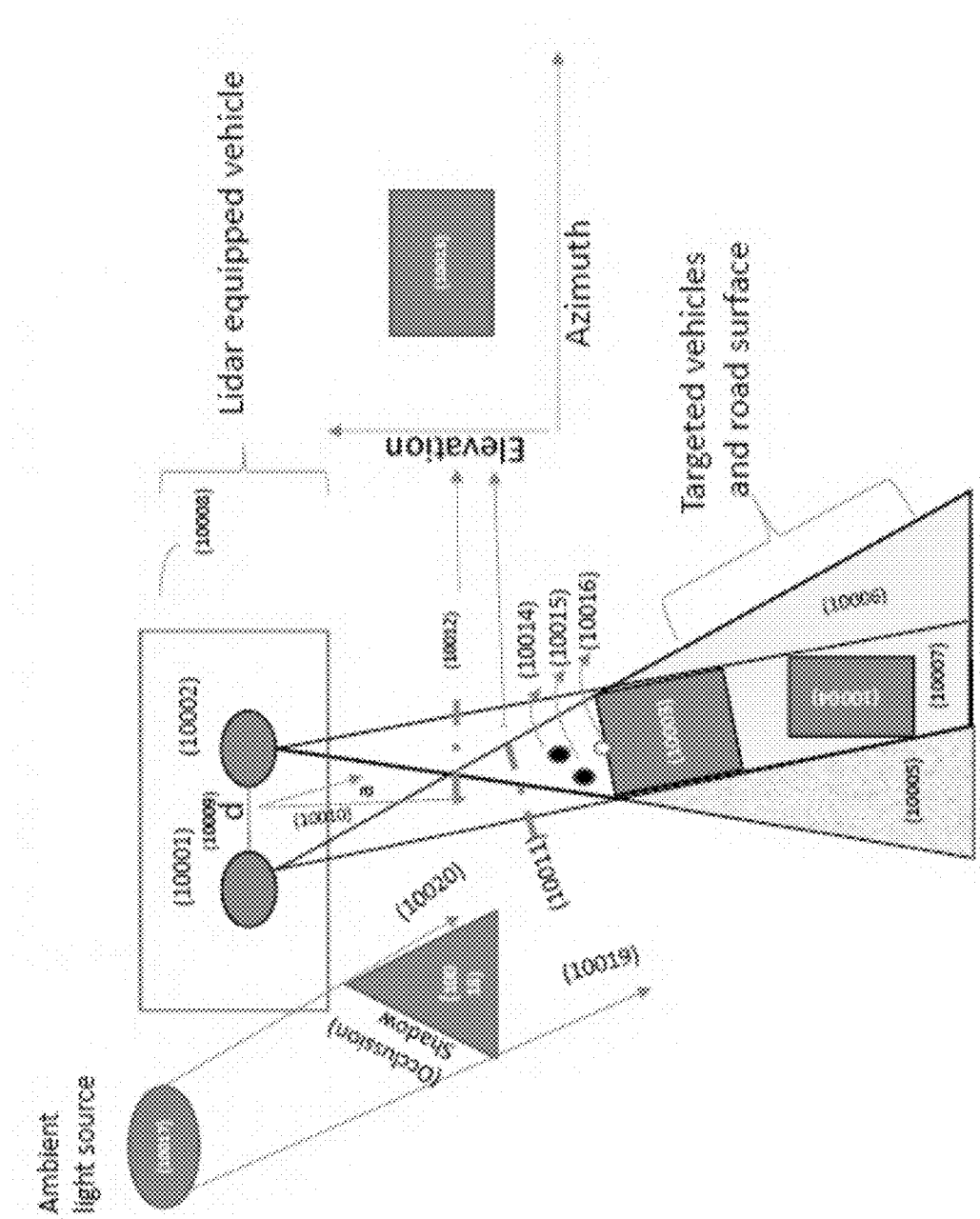
FIG. 14 shows an example scenario where low latency threat detection can be advantageous.

FIG. 14 shows an example embodiment that elaborates on details of several of the frames discussed above. First, considering shadowing in the video camera, reference number 10017 shows an illumination source (e.g., the sun, street light, headlight, etc.), and reference number 10018 shows an obstacle which occludes the light, thereby casting a shadow with boundaries defined by rays 10019 and 10020. In this example, all of target 10004 and some of target 10003 are not visible to a camera, but most of the shadowed region is recoverable using ladars 10001 and 10002 via use of a shadow-cued SDF.

We observe a scenario where a vehicle 10003 is obstructing a second vehicle 10004 that is more distant. For example, this may correspond to a scenario where the vehicle 10004 is a motorcycle that is in the process of overtaking vehicle 10003. This is a hazardous situation since many accidents involve motorcycles even though there are few motorcycles on the roads. In this example, we will consider that the motorcycle will be, for some period of time, in the lane of the ladar-equipped vehicle 10008, at least for some period of time. In our scenario, the vehicle 10008 has two sensors heads, each which comprise ladar and video (10001 and 10002). The shadow-cued SDF will be different for each ladar head. Note that the FIG. 14 sketch is not to scale, the separation between sensors on the vehicle 10008 are generally two meters or so, and the distance from vehicle 10008 to vehicle 10004 might be 100's of meters. Also the aspect ratio of the vehicles is not correct, but the form factor simplifies the narrative and evinces the salient points more easily.

The two triangles with vertexes at 10001 and 10002, and encompassing respectively shaded areas 10005, 10007 and 10006, 10007 show the field of view of the ladar and co-bore sited camera. Sensor 10001 has a shadow that is cast from 10003 that is shown as the shaded area 10006. Note that this includes vehicle 10004 so neither ladar nor camera see vehicle 10004. The same is true of sensor 10002. Note the shadow from sensor 10002 is cast from the rear of the vehicle and for sensor 10001 it is cast from the front on the right hand side, and on the left the front of 10003 is the apex of both shadows. The structured textured region 10005 shows the shadow of sensor 10002 which is not already shadowed from sensor 10001. The stereoscopic structure from motion will produce a bounding box for sensors 10001, 10002, where such bounding boxes are identified by 10011, 10012 respectively on vehicle 10003; which defines a new (region of interest) software frame 10013 for each ladar, to track vehicle 10003. The use of a tight ROI frame allows for lower SNR, for a given net false alarm rate, and hence less recharge time, reducing latency.

Note that if vehicle 10003 was not present, both cameras would see vehicle 10004, but from different angles. The practitioner will note that this enables a video camera to obtain structure from motion, specifically to infer range from the angle differences. The ladars, of course, give range directly. Since noise reduction arises from averaging the outputs of sensors, it can be observed that when objects are not occluded we can obtain more precise localization, and therefore speed and motion prediction, thereby again furthering range. This is shown in FIG. 14 by reference numbers 10014, 10015 [see the black dots] being locations from structured motion where the front of vehicle 10003 is estimated to be positioned. With the use of ranging from one or both ladars, we can obtain precise range, replacing the different, and both slightly erroneous target positions 10014), 10015, with the more accurate position 10016 [see the white dot]. The improved positioning, using the multi-lateration from distance d, 10009, and angle offset a 10010 leads immediately to a smaller estimated target volume 10013; which in turn increases effective SNR through reduced noise exposure as discussed previously in the velocity estimation narrative.

Itemized below are example use cases where motion planning value can be extracted from kinematic models such as 3D velocity and acceleration. In these examples, the detected and tracked target can be other vehicles that are within sensor range of the ladar-equipped vehicle. The motion data for these other vehicles are then used to calculate anticipated behavior for the ladar-equipped vehicle, individually or in the aggregate (such as traffic density) or to extract environmental conditions. These examples demonstrate the power of 3D velocity and acceleration estimation for use with the short pulse velocity ladar described herein. Furthermore, while these use cases are addressable by any ladar system, coherent or not, a coherent, random access ladar system as described herein and in the above-referenced and incorporated patents and patent applications is well-suited to the dynamic revisit times and selective probing (e.g., variable shot list), as outlined in FIGS. 12A and 12B. Furthermore, all these use cases are enhanced if the camera is able to feedback information to the ladar sensor faster than a video frame rate. For example, we discussed earlier that the ladar system can sample a given position with 60 usec or less, whereas a video frame is usually on the order of 5-10 msec (for a 200-100 fps camera), often at the sacrifice of FOV. As a result, if the camera can present data back to the ladar system on a per line basis; this can appreciably reduce latency. For example, a camera with 3 k×3 k pixels, a modern standard, would provide, with per line readout, a latency reduced by 3,000. So even if the update rate at the full 9M-pixel was limited to 20 Hz, we can have matched the ladar revisit if we drop the readout from a frame to a line. Because video exploitation is a more developed field than ladar, there are a variety of software tools and products available, such as Open CV, to address the below scenarios.

Environmental Perception for fast motion planning: exploiting other vehicles as "environmental probes"

Impending Bump/pothole—velocity redirected up or down along the vertical y axis
        Detection: rapid instantaneous vertical velocity, well in excess of the gradient of the road as evinced from maps.
        Utility: alert that a bump is imminent, allowing time to decelerate for passenger comfort, and or enhanced vehicle control.
    Onset of Rain/ice (skidding)—microscale vehicle velocity shifts in horizontal plane without bulk velocity vector change
        Detection: random walk of position of vehicle returns well in excess of standard ego (i.e., own car) motion.
        Utility: alert of unsafe [reduced grip] road conditions, update turn radius and braking models for vehicular control.
    Impending Winding/curving road—gradual lateral change (swaying) in horizontal direction with no change in speed, or possibly reduced speed
        Detection: Minor change in radially projected length of vehicle, and/or difference in velocity of rear and front of vehicle [if range resolved] or change in azimuthal centroid when SNR dependent range resolution is insufficient for the above detection modalities.
        Utility: Lateral change provides advanced warning of upcoming road curvature, allowing corrective action to vehicle controls before own-car road surface changes.
    Impending Traffic jam—deceleration/braking
        Detection: Coherent Deceleration pattern of vehicles in advance of lidar equipped vehicle.
        Utility: Advanced warning of the need to slow down, and/or change route planning exploring preferred path options.

Behavioral Perception: ascertaining intent of human or robotic drivers. Perception of behavior is a matter of anomalous detection. So, for example if a single vehicle is "flip flopping" then road surface cannot be the probative cause, rather the driving is decidedly the proximate culprit.

Aberrant driver behavior [drunkard or malfunctioning equipment]—subtle lateral change (swerving) in direction and speed (velocity vector)
        Detection: Change in radially projected length of vehicle, and/or difference in velocity of rear and front of vehicle [if range resolved] or change in azimuthal centroid when SNR dependent range resolution is insufficient for the above detection modalities.
        Utility: An aberrant driver, robotic or human, is a threatening driver. Advanced warning allows for evasive own-car proactive re-planning.
    "McDonald's stop" (spontaneous detouring)—rapid lateral change (swaying) in direction and speed (azimuthal velocity vector)
        Detection: Rapid change in radially projected length of vehicle, and/or difference in velocity of rear and front of vehicle [if range resolved] or change in azimuthal centroid when SNR dependent range resolution is insufficient for the above detection modalities.
        Utility: Avoid rear-ending said detourer.

Additional behavior mode detection that involves various mixtures of the above detection modes include:

Merging/Lane changing/passing—subtle or rapid lateral change in direction coupled with subtle or rapid acceleration.
    Emergency braking—z axis (radial) deceleration
    Left turn initiation—radial deceleration in advance of a turn lane.
    Yellow light protection (jumping the yellow)—lateral deceleration
    Brake failure induced coasting (hill)—gradual acceleration at consistent vector (with no deceleration).

While the invention has been described above in relation to its example embodiments, various modifications may be made thereto that still fall within the invention's scope. Such modifications to the invention will be recognizable upon review of the teachings herein.

What is claimed is:

1. A system for vehicle motion planning, the system comprising:
    a sensor; and
    a motion planning computer system in communication with the sensor;
    wherein the sensor has a field of view and is configured to detect a threatening or anomalous condition in the field of view;
    wherein the motion planning computer system is configured with a motion planning loop; and
    wherein the sensor and motion planning computer system are configured to cooperate such that the sensor is configured to provide a priority flag to the motion planning computer system that is indicative of the detected condition to thereby insert priority data about the detected condition into the motion planning loop.

2. The system of claim 1 wherein the sensor comprises a ladar system.

3. The system of claim 2 wherein the ladar system comprises a ladar transmitter configured with a compressive sensing capability with respect to range point targeting.

4. The system of claim 3 wherein the ladar system is configured to re-task its targeting of range points based on the detected condition.

5. The system of claim 4 wherein the ladar system includes memory for storing a point cloud of range point return data, and wherein the ladar system is further configured to exploit the point cloud to detect the condition.

6. The system of claim 3 wherein the ladar transmitter comprises a plurality of scanable mirrors for targeting the ladar transmitter.

7. The system of claim 3 wherein the ladar system comprises a ladar receiver configured with selective readout from a detector array based on range point targeting.

8. The system of claim 1 wherein the motion planning computer system is configured to treat the priority flag as a vector interrupt that alters a data stack used for decision-making by the motion planning loop.

9. The system of claim 2 wherein the sensor further comprises a camera.

10. The system of claim 9 wherein the camera is co-bore sited with respect to the ladar system.

11. The system of claim 9 wherein the camera includes a video controller configured to (1) read out image data corresponding to at least a portion of a field of view for the camera, and (2) detect motion within the field of view based on the read out image data.

12. A system for vehicle motion planning, the system comprising:
a sensor; and
a motion planning computer system in communication with the sensor;
wherein the sensor has a field of view and is configured to detect a threatening or anomalous condition in the field of view;
wherein the motion planning computer system is configured with a motion planning loop;
wherein the sensor and motion planning computer system are configured to cooperate such that the sensor is configured to insert priority data indicative of the detected condition into the motion planning loop;
wherein the sensor comprises a ladar system and a camera; and
wherein the camera is configured to detect a shimmer event as the detected condition.

13. A system for vehicle motion planning, the system comprising:
a sensor; and
a motion planning computer system in communication with the sensor;
wherein the sensor has a field of view and is configured to detect a threatening or anomalous condition in the field of view;
wherein the motion planning computer system is configured with a motion planning loop;
wherein the sensor and motion planning computer system are configured to cooperate such that the sensor is configured to insert priority data indicative of the detected condition into the motion planning loop;
wherein the sensor comprises a ladar system and a camera; and
wherein the camera is configured to detect a shiny object event as the detected condition.

14. A system for vehicle motion planning, the system comprising:
a sensor; and
a motion planning computer system in communication with the sensor;
wherein the sensor has a field of view and is configured to detect a threatening or anomalous condition in the field of view;
wherein the motion planning computer system is configured with a motion planning loop;
wherein the sensor and motion planning computer system are configured to cooperate such that the sensor is configured to insert priority data indicative of the detected condition into the motion planning loop;
wherein the sensor comprises a ladar system and a camera; and
wherein the ladar system and the camera are configured to cooperate via cross-cueing.

15. The system of claim 14 wherein the camera is configured to generate a shot list for use by the ladar system in response to the detected condition.

16. The system of claim 2 wherein the sensor further comprises a radar.

17. The system of claim 2 wherein the sensor further comprises an acoustic sensor.

18. The system of claim 2 wherein the sensor further comprises a vehicle telematics sensor.

19. The system of claim 2 wherein the sensor is configured to detect the condition via at least one of comparative, selective, and/or objective sensing.

20. A system for vehicle motion planning, the system comprising:
a sensor; and
a motion planning computer system in communication with the sensor;
wherein the sensor has a field of view and is configured to detect a threatening or anomalous condition in the field of view;
wherein the motion planning computer system is configured with a motion planning loop; and
wherein the sensor and motion planning computer system are configured to cooperate such that the sensor is configured to insert priority data indicative of the detected condition into the motion planning loop; and
wherein the sensor comprises a ladar system, and wherein the ladar system includes a ladar receiver that comprises a protection circuit configured to reduce saturation from high energy interference.

21. The system of claim 20 wherein the protection circuit includes a metallization layer that allows customization of the protection circuit at time of manufacturing.

22. The system of claim 1 wherein the sensor includes a field programmable gate array (FPGA), the FPGA configured to detect the condition.

23. A vehicle motion planning method comprising:
a sensor detecting a threatening or anomalous condition within a field of view, wherein the sensor includes a ladar system;
the sensor interrupting a motion planning loop of a motion planning computer system based on the detected condition;
the ladar system performing compressive sensing to target the field of view with a plurality of ladar pulses; and
the motion planning computer system making a decision about vehicle motion in response to the interrupting; and
wherein the interrupting includes the ladar system asserting a priority flag for receipt by the motion planning computer system in conjunction with a ladar frame.

24. The method of claim 23 wherein the detecting and interrupting are performed within one millisecond.

25. A vehicle motion planning method comprising:
a sensor detecting a threatening or anomalous condition within a field of view, wherein the sensor includes a ladar system;

the sensor interrupting a motion planning loop of a motion planning computer system based on the detected condition;

the ladar system performing compressive sensing to target the field of view with a plurality of ladar pulses;

the motion planning computer system making a decision about vehicle motion in response to the interrupting; and the ladar system re-tasking itself to probe a region within the field of view corresponding to the detected condition with a plurality of ladar pulses.

26. The method of claim 25 wherein the detecting and interrupting are performed within one millisecond.

27. The method of claim 25 wherein the interrupting includes the ladar system asserting a priority flag for receipt by the motion planning computer system in conjunction with a ladar frame.

28. The method of claim 27 further comprising:
the motion planning computer system treating the priority flag as a vector interrupt that alters a data stack used for decision-making by a motion planning loop of the motion planning computer system.

29. The method of claim 25 further comprising:
the ladar system storing a point cloud of range point return data; and
the ladar system exploiting the point cloud to detect the condition.

30. The method of claim 25 wherein the ladar system comprises a ladar transmitter, the ladar transmitter comprising a plurality of scanable mirrors for targeting the ladar transmitter.

31. The method of claim 25 wherein the ladar system comprises a ladar receiver, wherein the ladar receiver includes a detector array, the method further comprising:
the ladar receiver selectively reading out from the detector array based on range point targeting to detect ladar pulse returns.

32. The method of claim 25 wherein the sensor further includes a camera.

33. The method of claim 32 wherein the camera is co-bore sited with respect to the ladar system.

34. The method of claim 32 wherein the camera includes a video controller, the method further comprising:
the video controller reading out image data corresponding to at least a portion of a field of view for the camera; and
the video controller detecting motion within the field of view based on the read out image data.

35. The method of claim 32 wherein the detecting step comprises the camera detecting a shimmer event as the detected condition.

36. The method of claim 32 wherein the detecting step comprises the camera detecting a shiny object event as the detected condition.

37. The method of claim 32 further comprising:
the ladar system and the camera cooperating via cross-cueing.

38. The method of claim 37 further comprising:
the camera generating a shot list for use by the ladar system in response to the detected condition.

39. The method of claim 25 wherein the sensor further comprises a radar.

40. The method of claim 25 wherein the sensor further comprises an acoustic sensor.

41. The method of claim 25 wherein the sensor further comprises a vehicle telematics sensor.

42. The method of claim 25 wherein the detecting step comprises the sensor detecting the condition via at least one of comparative, selective, and/or objective sensing.

43. The method of claim 25 wherein the sensor includes a field programmable gate array (FPGA), wherein the FPGA performs the detecting step.

44. The method of claim 23 further comprising:
the motion planning computer system treating the priority flag as a vector interrupt that alters a data stack used for decision-making by a motion planning loop of the motion planning computer system.

45. The system of claim 12 wherein the ladar system comprises a ladar transmitter configured with a compressive sensing capability with respect to range point targeting.

46. The system of claim 45 wherein the ladar system is configured to re-task its targeting of range points based on the detected condition.

47. The system of claim 46 wherein the ladar system includes memory for storing a point cloud of range point return data, and wherein the ladar system is further configured to exploit the point cloud to detect the condition.

48. The system of claim 12 wherein the sensor is configured to provide a priority flag to the motion planning computer system that is indicative of the detected condition.

49. The system of claim 48 wherein the motion planning computer system is configured to treat the priority flag as a vector interrupt that alters a data stack used for decision-making by the motion planning loop.

50. The system of claim 12 wherein the camera is co-bore sited with respect to the ladar system.

51. The system of claim 12 wherein the sensor includes a field programmable gate array (FPGA), the FPGA configured to detect the condition.

52. The system of claim 13 wherein the ladar system comprises a ladar transmitter configured with a compressive sensing capability with respect to range point targeting.

53. The system of claim 52 wherein the ladar system is configured to re-task its targeting of range points based on the detected condition.

54. The system of claim 53 wherein the ladar system includes memory for storing a point cloud of range point return data, and wherein the ladar system is further configured to exploit the point cloud to detect the condition.

55. The system of claim 13 wherein the sensor is configured to provide a priority flag to the motion planning computer system that is indicative of the detected condition.

56. The system of claim 55 wherein the motion planning computer system is configured to treat the priority flag as a vector interrupt that alters a data stack used for decision-making by the motion planning loop.

57. The system of claim 13 wherein the camera is co-bore sited with respect to the ladar system.

58. The system of claim 13 wherein the sensor includes a field programmable gate array (FPGA), the FPGA configured to detect the condition.

59. The system of claim 14 wherein the ladar system comprises a ladar transmitter configured with a compressive sensing capability with respect to range point targeting.

60. The system of claim 59 wherein the ladar system is configured to re-task its targeting of range points based on the detected condition.

61. The system of claim 60 wherein the ladar system includes memory for storing a point cloud of range point return data, and wherein the ladar system is further configured to exploit the point cloud to detect the condition.

62. The system of claim 14 wherein the sensor is configured to provide a priority flag to the motion planning computer system that is indicative of the detected condition.

63. The system of claim 62 wherein the motion planning computer system is configured to treat the priority flag as a vector interrupt that alters a data stack used for decision-making by the motion planning loop.

64. The system of claim 14 wherein the camera is co-bore sited with respect to the ladar system.

65. The system of claim 14 wherein the sensor includes a field programmable gate array (FPGA), the FPGA configured to detect the condition.

* * * * *